US008762441B2

(12) United States Patent
Reznik

(10) Patent No.: US 8,762,441 B2
(45) Date of Patent: *Jun. 24, 2014

(54) 4X4 TRANSFORM FOR MEDIA CODING

(75) Inventor: Yuriy Reznik, Seattle, WA (US)

(73) Assignee: Qualcomm Incorporated, San Diego, CA (US)

( * ) Notice: Subject to any disclaimer, the term of this patent is extended or adjusted under 35 U.S.C. 154(b) by 611 days.

This patent is subject to a terminal disclaimer.

(21) Appl. No.: 12/788,666

(22) Filed: May 27, 2010

(65) Prior Publication Data

US 2010/0312811 A1 Dec. 9, 2010

Related U.S. Application Data

(60) Provisional application No. 61/184,656, filed on Jun. 5, 2009, provisional application No. 61/219,887, filed on Jun. 24, 2009.

(51) Int. Cl.
*G06F 17/14* (2006.01)

(52) U.S. Cl.
USPC .......................................................... 708/402

(58) Field of Classification Search
CPC .................................................... G06F 17/147
USPC .......................................................... 708/402
See application file for complete search history.

(56) References Cited

U.S. PATENT DOCUMENTS

| 5,278,646 A | 1/1994 | Civanlar et al. |
| 5,408,425 A | 4/1995 | Hou |
| 5,508,949 A | 4/1996 | Konstantinides |
| 5,649,077 A | 7/1997 | On et al. |
| 5,737,450 A | 4/1998 | Hajjahmad et al. |
| 5,768,167 A | 6/1998 | Kuroda |
| 5,959,675 A | 9/1999 | Mita et al. |
| 7,366,236 B1 | 4/2008 | Winger |
| 7,412,100 B2 | 8/2008 | Raveendran et al. |

(Continued)

FOREIGN PATENT DOCUMENTS

| CN | 1791222 A | 6/2006 |
| JP | H09212484 A | 8/1997 |

(Continued)

OTHER PUBLICATIONS

Reznik et al., "Efficient Fixed-Point Approximations of 8×8 Inverse Discrete Cosine Transform." Applications of Digital Image Processing XXX, vol. 6696, Oct. 8, 2007, 17 pp.

(Continued)

*Primary Examiner* — Chuong D Ngo
*Assistant Examiner* — Kevin G Hughes
(74) *Attorney, Agent, or Firm* — Brent A. Boyd

(57) ABSTRACT

In general, techniques are described that provide for 4×4 transforms for media coding. A number of different 4×4 transforms are described that adhere to these techniques. As one example, an apparatus includes a 4×4 discrete cosine transform (DCT) hardware unit. The DCT hardware unit implements an orthogonal 4×4 DCT having an odd portion that applies first and second internal factors (C, S) that are related to a scaled factor (ξ) such that the scaled factor equals a square root of a sum of a square of the first internal factor (C) plus a square of the second internal factor (S). The 4×4 DCT hardware unit applies the 4×4 DCT implementation to media data to transform the media data from a spatial domain to a frequency domain. As another example, an apparatus implements a non-orthogonal 4×4 DCT to improve coding gain.

42 Claims, 11 Drawing Sheets

(56) References Cited

U.S. PATENT DOCUMENTS

| | | | |
|---|---|---|---|
| 7,437,394 | B2 | 10/2008 | Hou |
| 7,725,516 | B2 | 5/2010 | Liu |
| 8,451,904 | B2 | 5/2013 | Reznik et al. |
| 2001/0054051 | A1 | 12/2001 | Tajime |
| 2002/0106020 | A1 | 8/2002 | Cheng et al. |
| 2003/0078952 | A1 | 4/2003 | Kim et al. |
| 2003/0093452 | A1 | 5/2003 | Zhou |
| 2003/0177158 | A1 | 9/2003 | Zheltov et al. |
| 2004/0136602 | A1 | 7/2004 | Nagaraj et al. |
| 2005/0069035 | A1 | 3/2005 | Lu et al. |
| 2005/0141609 | A1 | 6/2005 | Malvar et al. |
| 2005/0213835 | A1 | 9/2005 | Guangxi et al. |
| 2005/0281331 | A1 | 12/2005 | Hahm et al. |
| 2006/0126962 | A1 | 6/2006 | Sun |
| 2006/0165164 | A1 | 7/2006 | Kwan et al. |
| 2007/0025441 | A1 | 2/2007 | Ugur et al. |
| 2007/0156398 | A1 | 7/2007 | Hung et al. |
| 2007/0168410 | A1 | 7/2007 | Reznik |
| 2007/0200738 | A1 | 8/2007 | Reznik et al. |
| 2007/0233764 | A1 | 10/2007 | Reznik et al. |
| 2007/0297503 | A1 | 12/2007 | Reznik |
| 2008/0037656 | A1 | 2/2008 | Hannuksela |
| 2009/0080515 | A1 | 3/2009 | Nagaraj et al. |
| 2009/0086816 | A1 | 4/2009 | Leontaris et al. |
| 2009/0141808 | A1 | 6/2009 | Wong |
| 2009/0157785 | A1 | 6/2009 | Reznik et al. |
| 2009/0180700 | A1 | 7/2009 | Kim et al. |
| 2010/0172409 | A1 | 7/2010 | Reznik et al. |
| 2010/0266008 | A1 | 10/2010 | Reznik |
| 2010/0309974 | A1 | 12/2010 | Reznik |
| 2010/0329329 | A1 | 12/2010 | Reznik et al. |
| 2011/0150078 | A1 | 6/2011 | Reznik et al. |
| 2011/0150079 | A1 | 6/2011 | Reznik et al. |
| 2011/0153699 | A1 | 6/2011 | Reznik et al. |
| 2012/0177108 | A1 | 7/2012 | Joshi et al. |
| 2013/0121406 | A1 | 5/2013 | Reznik et al. |
| 2013/0148718 | A1 | 6/2013 | Reznik et al. |

FOREIGN PATENT DOCUMENTS

| | | |
|---|---|---|
| JP | 2003223433 A | 8/2003 |
| JP | 2003281115 A | 10/2003 |
| JP | 2007129731 A | 5/2007 |
| KR | 1020010043396 | 5/2001 |
| KR | 100545445 B1 | 1/2006 |
| KR | 20060112255 A | 10/2006 |
| TW | I241074 B | 10/2005 |
| TW | 200714076 A | 4/2007 |
| TW | 200727578 | 7/2007 |
| TW | 200741486 A | 11/2007 |
| TW | 200801980 | 1/2008 |
| TW | I295455 B | 4/2008 |
| TW | I310526 B | 6/2009 |
| WO | 9910818 A1 | 3/1999 |
| WO | 0159603 A1 | 8/2001 |
| WO | 2009042943 A2 | 4/2009 |

OTHER PUBLICATIONS

Loeffler, "Algorithm-architecture mapping for custom DCT chips." in Proc. Int, Symp. Circuits Syst. (Helsinki, Finland), Jun. 1988, pp. 1953-1956.

Liang, "Fast Multiplierless Approximations of the DCT With the Lifting Scheme," IEEE Transactions on Signal Processing, vol. 49, No. 12, Dec. 2001, pp. 3032-3044.

Sullivan, "Standardization of IDCT approximation behavior for video compression: the history and the new MPEG-C parts 1 and 2 standards," Applications of Digital Image Processing XXX vol. 6696, 2007, 22 pp.

Loeffler et al., "Practical Fast 1-D DCT Algorithms With 11 Multiplications," IEEE, 1989, pp. 988-991.

Huang et al., "An Array-based Scalable Architecture for DCT Computations in Video Coding," IEEE International Conference Neural Networks & Signal Processing, Zhenjiang, China, Jun. 8-10, 2000, pp. 451-455.

Rao et al., "Discrete Cosine Transform: Algorithms, Advantages, Applications", Academic Press, San Diego, 1990.

Britanak et al., "Discrete Cosine and Sine Transforms: General Properties, Fast Algorithms and Integer Approximations", Academic Press, 2006.

Cham, "Development of integer cosine transforms by the principle of dyadic symmetry," Communications, Speech and Vision, IEE Proceedings I, vol. 136, No. 4, pp. 276-282, Aug. 1989.

Reznik et al., "Improved Precision of Fixed-Point Algorithms by Means of Common Factors," Proc. ICIP 2008 San Diego, CA.

Reznik et al., "On Design of Transforms for High-Resolution/High-Performance Video Coding, MPEG input document M16438," MPEG's 88th meeting, Maui, HI, Apr. 2009.

Artieri et al., "A one chip VLSI for real time two-dimensional discrete cosine transform", 1988 IEEE International Symposium on Circuits and Systems (ISCAS'88), Jun. 7-9, 1988, Espoo, Finland, Jun. 7, 1988, pp. 701-704, XP010069645.

Beaulieu, et al., "Multi-Spectral Image Resolution Refinement Using Stationary Wavelet Transform", Geoscience and Remote Sensing Symposium 2003, IGARSS '03 Proceedings IEEE International, 2003, vol. 6, pp. 4032-4034.

Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-11003_d21, pp. 290.

Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chan et al., "Direct methods for computing discrete sinusoidal transforms," Proc. IEE, vol. 137, Pt. F, No. 6, pp. 433-442, Dec. 1990.

Chan et al: "Fast algorithms for computing the discrete cosine transform", IEEE Transactions on Circuits and Systems II: Analog and Digital Signal Processing, vol. 39, No. 3, Mar. 1992, pp. 185-190, XP000305256, ISSN: 1057-7130, DOI: 10.1109/82.127302.

Chivukula R K: "Fast algorithms for MDCT and low delay filterbanks used in audio coding", Master's Thesis, Electrical Engineering, The University of Texas at Arlington, USA, Aug. 8, 2008, XP007906591,Retrieved from the Internet: URL:http://dspace.uta.edu/handle/10106/921.

Dai X et al: "Fast algorithm for modulated complex lapped transform", IEEE Signal Processing Letters, vol. 16, No. 1, Jan. 2009, pp. 30-33, XP011239818, ISSN: 1070-9908, DOI: 10.1109/LSP.2008.2008434.

Dong et al., "2-D order-16 integer transforms for HD video coding", IEEE Transactions on Circuits and Systems for Video Technology, Oct. 2009, pp. 1462-1474, vol. 19, No. 10, XP011270110, ISSN: 1051-8215, DOI: 10. 1109/TCSVT.2009.2026792.

Feig et al: "Scaled DCT's on input sizes that are composite", IEEE Transactions on Signal Processing, vol. 43, No. 1, Jan. 1995, pp. 43-50, XP000826361, ISSN: 1053-587X, DOI: 10.1109/78.365284.

Feig et al., "On the Multiplicative Complexity of Discrete Cosine Transforms (Corresp.)" IEEE Transactions on Information Theory, vol. 38, No. 4, pp. 1387-1391, (Jul. 1992).

Graps, "An Introduction to Wavelets," IEEE Computational Science and Engineering, Summer 1995, vol. 2, No. 2, 18 PP.

Heideman, M.T.: "Computation of an Odd-Length DCT from a Real-Valued DFT of The Same Length," IEEE Transactions on Signal

(56) References Cited

OTHER PUBLICATIONS

Processing, IEEE Service Center, New York, NY, US, vol. 40, No. 1, pp. 54-64 (Jan. 1, 1992) XP000270173 ISSN: 1053-587X.
International Search Report and Written Opinion—PCT/US2010/037518—ISA/EPO—Apr. 5, 2012.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Joshi et al., "Efficient large size transforms for high-performance video coding", Applications of Digital Image Processing XXXIII, Sep. 7, 2010, pp. 77980W-1-77980W-7, vol. 7798, Proceedings of SPIE, XP055007446, ISSN: 0277-786X, DOI: 10.1117/12.862250.
Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.
Karczewicz et al., "A hybrid video coder based on extended macroblock sizes, improved interpolation, and flexible motion representation", IEEE Transactions on Circuits and Systems for Video Technology, Dec. 2010, pp. 1698-1708, vol. 20, No. 12, XP011329406, ISSN: 1051-8215, DOI: 10. 1109/TCSVT.2010.2092614.
Karczewicz et al., "Video coding technology proposal by Qualcomm", ITU-T SG16 WP3 and ISO/IEC JTC1/SC29/WG11, Document JCTVC-A121, 1st JCT-VC Meeting, Apr. 15-23, 2010, Dresden, Germany, May 18, 2010, pp. 1-24, XP030007567, Retrieved from the Internet: URL: http://wftp3.itu.int/av-arch/jctvc-site/2010_04_A_Dresden/JCTVC-A121.zip.
Kok, C.W.: "Fast Algorithm for Computing Discrete Cosine Transform," IEEE Transactions on Signal Processing, IEEE Service Center, New York, NY, US, vol. 45, No. 3 , XP011057726 ISSN: 1053-587X, pp. 757-760 (Mar. 1, 1997).
Malvar et al., "Low-Complexity Transform and Quantization in H.264/AVC," IEEE Transactions on Circuits and Systems for Video Technology, Jul. 2003, pp. 598-603, vol. 13 (7), XP011099252, ISSN: 1051-8215, DOI: 10.1109/TCSVT.2003.814964.
Ohm et al., "Special Section on the Joint Call for Proposals on High Efficiency Video Coding (HEVC) Standardization", IEEE Transactions on Circuits and Systems for Video Technology, Dec. 2010, pp. 1661-1666, vol. 20, No. 12, XP011334854, ISSN: 1051-8215, DOI: 10. 1109/TCSVT.2010.2095692.
Plonka et al., "Fast and numerically stable algorithms for discrete cosine transforms", Linear Algebra and Applications, Jan. 2005, pp. 309-345, vol. 394 No. 1, XP004613691, ISSN: 0024-3795, DOI: 10.1016/J.LAA.2004.07.015.
Rao et al.: "Discrete Cosine Transform Algorithms, Advantages, Applications," Academic Press, Inc., San Diego, CA, 1990, ch 2, pp. 7-25.
Reznik et al: "Design of fast transforms for high-resolution image and video coding", Applications of Digital Image Processing XXXII, Proceedings of SPIE, vol. 7443, Sep. 2, 2009, pp. 744312-1-744312-17, XP55007444.
Reznik et al: "Fast 15×15 transform for image and video coding applications", Data Compression Conference 2009 (DCC '09), Mar. 16-18, 2009, Snowbird, UT, USA, Mar. 16, 2009, p. 465, XP031461157, ISBN: 978-1-4244-3753-5.
Reznik Y A: "On fast algorithm for computing even-length DCT", arXiv: 1001.3713v1 [cs.DS], Jan. 21, 2010, XP55007457, Retrieved from the Internet: URL: http://arxiv.org/PS-cache/arxiv/pdf/1001/1001.3713v1.pdf [retrieved on Sep. 19, 2011].
Reznik et al., "Low-Drift Fixed-Point 8×8 IDCT Approximation with 8-Bit Transform Factors", Image Processing, 2007. ICIP 2007. IEEE International Conference on, IEEE, PI, Sep. 1, 2007, pp. VI-81, XP031158267, ISBN: 978-1-4244-1436-9 the whole document.
Reznik et al., "On complexity of size 960 transform in AAC family of codecs", ISO/IEC JTC1/SC29/WG11 M16443, Apr. 2009, Maui, HI, USA, Apr. 17, 2009, XP030045040, section 2.
Taiwan Search Report—TW099120640—TIPO—Mar. 28, 2013.
Li et al: "A unified computing kernel for MDCT/IMDCT in modern audio coding standards", Proceedings of International Symposium on Communications and Information Technologies 2007 (ISCIT 07), Oct. 17-19, 2007, Sidney, Australia, Oct. 17, 2007, pp. 546-550, XP031166524, DOI: 10.1109/ISCIT.2007.4392079 ISBN: 978-1-4244-0976-1.
Wiegand et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Wiegand et al., "WD3: Working Draft 3 of High-Efficiency Video Coding," Document JCTVC-E603, 5th Meeting: Geneva, CH, Mar. 16-23, 2011,pp. 193.
Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Xiong et at., "A Comparative Study of DCT-and Wavelet-Based image Coding," IEEE Transactions on Circuits and Systems for Video Technology. vol. 9, No. 5, Aug. 1999, pp. 692-695.
Fuldseth A., et al., "Transform design for HEVC with 16 bit intermediate data representation", ITU-T SG16 WP3 and ISO/IEC JTC1/SC29/WG11, Document JCTVC-E243, 5th JCT-VC Meeting, Mar. 16-23, 2011, Geneva, CH, No. JCTVC-E243, Mar. 18, 2011, pp. 1-16; XP030048334.
Fuldseth A., et al., "Unified transform design for HEVC with 16 bit intermediate data representation", ITU-T SG16 WP3 and ISO/IEC JTC1/SC29NVG11, Document JCTVC-D224, 4th JCT-VC Meeting, Jan. 20-28, 2011, Daegu, KR, No. JCTVC-D224, Jan. 15, 2011, pp. 1-7; XP030008264, ISSN: 0000-0013.
Joshi, et al., "Efficient 16 and 32-point transforms," Joint Collaborative Team on Video Coding (JCT-VC) of ITU-T SG16 WP3 and ISO 6G16 WP3 and ISO.IEC JTCI/SC29/WG11, 4th Meeting: Daegu, KR, Jan. 20-28, 2011, 8 pp.
Joshi R et al: "CE10: Scaled orthogonal integer transforms supporting recursive factorization structure", 5. JCT-VV Meeting; 96. MPEG Meeting; Mar. 16-23, 2011; Geneva; (Joint Collaborative Team on Video Coding of ISO/IEC JTC1/SC29/WG11 and ITU-T SG. 16); URL:http://wftp3.itu.int/av-arch/jc tvc-site/, No. JCTVC-E370, Mar. 11, 2011, 8 pp.; XP030008876, ISSN: 0000-0005 the whole document.
Joshi R., et al., "CE10: Scaled orthogonal integer transforms supporting recursive factorization structure", ITU-T SG16 WP3 and ISO/IEC JTC1/SC29/WG11, Document JCTVC-F352 R1, 6th JCT-VC Meeting, Jul. 14-22, 2011, Torino, IT, No. JCTVC-F352 R1, Jul. 12, 2011, 12 pp.; XP030049338.
Joshi R., et al., "Recursive factorization for 16 and 32-point transforms using 4 and 8-point HM 3.0 core transforms", ITU-T SG16 WP3 and ISO/IEC JTC1/SC29/WG11, Document JCTVC-F592, 6th JCT-VC Meeting, Jul. 14-22, 2011, Torino, IT, No. JCVC-F592, Jul. 18, 2011, 4 pp.; XP030049589.
Sadafale M., et al., "Low-complexity configurable transform architecture for HEVC", ITU-T SG16 WP3 and ISO/IEC JTC1/SC29/WG11, Document JCTVC-C226, 3rd JCT-VC Meeting, Oct. 7-15, 2010, Guangzhou, CN, No. JCTVC-C226, Oct. 2, 2010, 4 pp.; XP030007933, ISSN: 0000-0019.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

4X4 TRANSFORM FOR MEDIA CODING

This application claims the benefit of U.S. Provisional Application No. 61/184,656, filed Jun. 5, 2009 and U.S. Provisional Application No. 61/219,887, filed Jun. 24, 2009.

The present application for patent is related to the following co-ending U.S. patent application:

4×4 TRANSFORM FOR MEDIA CODING, having Ser. No. 12/788,625, filed concurrently herewith, assigned to the assignee hereof and expressly incorporated by reference herein.

TECHNICAL FIELD

This disclosure relates to data compression and, more particularly, data compression involving transforms.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in a wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

In general, video compression techniques perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

A video encoder then applies a transform followed by quantization and lossless statistical coding processes to further reduce the bit rate of the residual block produced by the video coding process. In some instances, the applied transform comprises a discrete cosine transform (DCT). Typically, the DCT is applied to video blocks whose size is a power of two, such as a video block that is 4 pixels high by 4 pixels wide (which is often referred to as a "4×4 video block"). These DCTs may therefore be referred to as 4×4 DCTs in that these DCTs are applied to 4×4 video blocks to produce a 4×4 matrix of DCT coefficients. The 4×4 matrix of DCT coefficients produced from applying a 4×4 DCT to the residual block then undergo quantization and lossless statistical coding processes to generate a bitstream. Examples of statistical coding processes (also known as "entropy coding" processes) include context-adaptive variable length coding (CAVLC) or context-adaptive binary arithmetic coding (CABAC). A video decoder receives the encoded bitstream and performs lossless decoding to decompress residual information for each of the blocks. Using the residual information and motion information, the video decoder reconstructs the encoded video.

SUMMARY

In general, this disclosure is directed to techniques for coding data, such as media data, using one or more implementations of an approximation of 4×4 discrete cosine transform (DCT) that may provide increased coding gain relative to conventional 4×4 DCTs. The implementations of the 4×4 DCT applied in accordance with the techniques of this disclosure involve various relationships between scaled factors and internal factors. The term "scaled factors" refers to factors external from the implementation of the 4×4 DCT that are removed through factorization. The term "internal factors" refers to factors internal to the implementation of the 4×4 DCT that remain after factorization. One example implementation of the 4×4 DCT is orthogonal, which implies that the matrix of coefficients representative of the 4×4 DCT, when multiplied by a transpose of this matrix, equals the identity matrix. Another example implementation of the 4×4 DCT is near-orthogonal (or approximately orthogonal). By adhering to the various relationships described in detail below, the techniques facilitate selection of matrix coefficients in both instances that result in orthogonal and near-orthogonal 4×4 DCT implementations, which, when applied to data, may promote increased coding gain relative to convention 4×4 DCTs.

In one aspect, an apparatus comprises a 4×4 discrete cosine transform (DCT) hardware unit that implements an orthogonal 4×4 DCT having an odd portion that applies first and second internal factors (C, S) that are related to a scaled factor ($\xi$) such that the scaled factor equals a square root of a sum of a square of the first internal factor (C) plus a square of the second internal factor (S), wherein the 4×4 DCT hardware unit applies the 4×4 DCT implementation to media data to transform the media data from a spatial domain to a frequency domain.

In another aspect, a method comprises applying an orthogonal 4×4 discreet cosine transform (DCT) implementation with a 4×4 DCT hardware unit to media data to transform the media data from a spatial domain to a frequency domain, wherein the orthogonal 4×4 DCT implementation includes an odd portion that applies first and second internal factors (C, S) that are related to a scaled factor ($\xi$) such that the scaled factor equals a square root of a sum of a square of the first internal factor (C) plus a square of the second internal factor (S).

In another aspect, an apparatus comprises means for applying an orthogonal 4×4 discreet cosine transform (DCT) implementation to media data to transform the media data from a spatial domain to a frequency domain, wherein the orthogonal 4×4 DCT implementation includes an odd portion that applies first and second internal factors (C, S) that are related to a scaled factor ($\xi$) such that the scaled factor equals a square root of a sum of a square of the first internal factor (C) plus a square of the second internal factor (S).

In another aspect, a non-transitory computer-readable storage medium stores instructions that, when executed by a processor, cause the processor to apply an orthogonal 4×4 discreet cosine transform (DCT) implementation with a 4×4 DCT hardware unit to media data to transform the media data from a spatial domain to a frequency domain, wherein the orthogonal 4×4 DCT implementation includes an odd portion that applies first and second internal factors (C, S) that are related to a scaled factor (ξ) such that the scaled factor equals a square root of a sum of a square of the first internal factor (C) plus a square of the second internal factor (S).

In another aspect, an apparatus comprises a 4×4 inverse discrete cosine transform (IDCT) hardware unit that implements an IDCT of an orthogonal 4×4 DCT having an odd portion that applies first and second internal factors (C, S) that are related to a scaled factor (ξ) such that the scaled factor equals a square root of a sum of a square of the first internal factor (C) plus a square of the second internal factor (S), wherein the 4×4 IDCT hardware unit applies the 4×4 IDCT implementation to DCT coefficients representative of media data to transform the media data from a frequency domain to a spatial domain.

In another aspect, a method comprises applying a 4×4 inverse discrete cosine transform (IDCT) of an orthogonal 4×4 DCT with a 4×4 IDCT hardware unit to DCT coefficients representative of media data to transform the media data from a frequency domain to a spatial domain, wherein the orthogonal 4×4 DCT includes an odd portion that applies first and second internal factors (C, S) that are related to a scaled factor (ξ) such that the scaled factor equals a square root of a sum of a square of the first internal factor (C) plus a square of the second internal factor (S).

In another aspect, an apparatus comprises means for applying a 4×4 inverse discrete cosine transform (IDCT) of an orthogonal 4×4 DCT to DCT coefficients representative of media data to transform the media data from a frequency domain to a spatial domain, wherein the orthogonal 4×4 DCT includes an odd portion that applies first and second internal factors (C, S) that are related to a scaled factor (ξ) such that the scaled factor equals a square root of a sum of a square of the first internal factor (C) plus a square of the second internal factor (S).

In another aspect, a non-transitory computer-readable storage medium stores instructions that, when executed by a processor, cause the processor to apply a 4×4 inverse discrete cosine transform (IDCT) of an orthogonal 4×4 DCT with a 4×4 IDCT hardware unit to DCT coefficients representative of media data to transform the media data from a frequency domain to a spatial domain, wherein the orthogonal 4×4 DCT includes an odd portion that applies first and second internal factors (C, S) that are related to a scaled factor (ξ) such that the scaled factor equals a square root of a sum of a square of the first internal factor (C) plus a square of the second internal factor (S).

In another aspect, an apparatus comprises a 4×4 discrete cosine transform (DCT) hardware unit, wherein the DCT module implements a non-orthogonal 4×4 DCT having an odd portion that applies first and second variables (C, S) that are related to a scaled factor (ξ) by the following equation:

$$\xi = \frac{C+S}{\omega + \psi},$$

wherein variables $\omega$ and $\psi$ denote irrational internal transform factors and variables C and S denote dyadic rational internal transform factors used in place of variables $\omega$ and $\psi$ in integer implementations of the non-orthogonal 4×4 DCT, and wherein the 4×4 DCT hardware unit applies the 4×4 DCT implementation to media data to transform the media data from a spatial domain to a frequency domain.

In another aspect, a method comprises applying a non-orthogonal 4×4 discrete cosine transform (DCT) with a 4×4 DCT hardware unit to media data to transform the media data from a spatial domain to a frequency domain, wherein the non-orthogonal 4×4 DCT includes an odd portion that applies first and second variables (C, S) that are related to a scaled factor (ξ) by the following equation:

$$\xi = \frac{C+S}{\omega + \psi},$$

wherein variables $\omega$ and $\psi$ denote irrational internal transform factors and variables C and S denote dyadic rational internal transform factors used in place of variables $\omega$ and $\psi$ in integer implementations of the non-orthogonal 4×4 DCT.

In another aspect, an apparatus comprises means for applying a non-orthogonal 4×4 discrete cosine transform (DCT) with a 4×4 DCT hardware unit to media data to transform the media data from a spatial domain to a frequency domain, wherein the non-orthogonal 4×4 DCT includes an odd portion that applies first and second variables (C, S) that are related to a scaled factor (ξ) by the following equation:

$$\xi = \frac{C+S}{\omega + \psi},$$

wherein variables $\omega$ and $\psi$ denote irrational internal transform factors and variables C and S denote dyadic rational internal transform factors used in place of variables $\omega$ and $\psi$ in integer implementations of the non-orthogonal 4×4 DCT.

In another aspect, a non-transitory computer-readable storage medium stores instructions that, when executed by a processor, cause the processor to apply a non-orthogonal 4×4 discrete cosine transform (DCT) with a 4×4 DCT hardware unit to media data to transform the media data from a spatial domain to a frequency domain, wherein the non-orthogonal 4×4 DCT includes an odd portion that applies first and second variables (C, S) that are related to a scaled factor (ξ) by the following equation:

$$\xi = \frac{C+S}{\omega + \psi},$$

wherein variables $\omega$ and $\psi$ denote irrational internal transform factors and variables C and S denote dyadic rational internal transform factors used in place of variables $\omega$ and $\psi$ in integer implementations of the non-orthogonal 4×4 DCT.

In another aspect, an apparatus comprises a 4×4 inverse discrete cosine transform (IDCT) hardware unit, wherein the DCT hardware unit implements an inverse DCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables $\omega$ and $\psi$ denote irrational internal transform factors and variables C and S denote dyadic rational internal transform factors used in place of variables $\omega$ and $\psi$ in integer implementations of the non-orthogonal 4×4 DCT, and wherein the 4×4 IDCT hardware unit applies the 4×4

IDCT implementation to DCT coefficients representative of media data to transform the media data from a frequency domain to a spatial domain.

In another aspect, a method comprises applying a 4×4 inverse discrete cosine transform (IDCT) with a 4×4 IDCT hardware unit to DCT coefficients representative of media data to transform the media data from a frequency domain to a spatial domain, wherein the 4×4 IDCT comprises an IDCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT.

In another aspect, an apparatus comprises means for applying a 4×4 inverse discrete cosine transform (IDCT) with a 4×4 IDCT hardware unit to DCT coefficients representative of media data to transform the media data from a frequency domain to a spatial domain, wherein the 4×4 IDCT comprises an IDCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT.

In another aspect, a non-transitory computer-readable storage medium stores instructions that, when executed by a processor, cause the processor to apply a 4×4 inverse discrete cosine transform (IDCT) with a 4×4 IDCT hardware unit to DCT coefficients representative of media data to transform the media data from a frequency domain to a spatial domain, wherein the 4×4 IDCT comprises an IDCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT.

In another aspect, an apparatus comprises a 4×4 discrete cosine transform (DCT) hardware unit that implements a non-orthogonal 4×4 DCT having an odd portion that applies first and second internal factors (A, B) that are related to a scaled factor (ξ) by the following equation:

$$\xi = \frac{A+B}{1 + 1/\sqrt{2}},$$

wherein the scaled factor (ξ) equals a sum of the first internal factor (A) plus the second internal factor (B) divided by one plus one divided by the square root of two, and wherein the 4×4 DCT hardware unit applies the 4×4 DCT implementation to media data to transform the media data from a spatial domain to a frequency domain.

In another aspect, a method comprises applying a non-orthogonal 4×4 discrete cosine transform (DCT) with a 4×4 DCT hardware unit to media data to transform the media data from a spatial domain to a frequency domain. The non-orthogonal 4×4 DCT includes an odd portion that applies first and second internal factors (A, B) that are related to a scaled factor (ξ) by the following equation:

$$\xi = \frac{A+B}{1 + 1/\sqrt{2}},$$

wherein the scaled factor (ξ) equals a sum of the first internal factor (A) plus the second internal factor (B) divided by one plus one divided by the square root of two.

In another aspect, an apparatus comprises means for applying a non-orthogonal 4×4 discrete cosine transform (DCT) with a 4×4 DCT hardware unit to media data to transform the media data from a spatial domain to a frequency domain, wherein the non-orthogonal 4×4 DCT includes an odd portion that applies first and second internal factors (A, B) that are related to a scaled factor (ξ) by the following equation:

$$\xi = \frac{A+B}{1 + 1/\sqrt{2}},$$

wherein the scaled factor (ξ) equals a sum of the first internal factor (A) plus the second internal factor (B) divided by one plus one divided by the square root of two.

In another aspect, a non-transitory computer-readable storage medium stores instructions that, when executed by a processor, cause the processor to apply a non-orthogonal 4×4 discrete cosine transform (DCT) with a 4×4 DCT hardware unit to media data to transform the media data from a spatial domain to a frequency domain. The non-orthogonal 4×4 DCT includes an odd portion that applies first and second internal factors (A, B) that are related to a scaled factor (ξ) by the following equation:

$$\xi = \frac{A+B}{1 + 1/\sqrt{2}},$$

wherein the scaled factor (ξ) equals a sum of the first internal factor (A) plus the second internal factor (B) divided by one plus one divided by the square root of two.

In another aspect, an apparatus comprises a 4×4 inverse discrete cosine transform (IDCT) hardware unit, wherein the 4×4 IDCT hardware unit implements an IDCT of a non-orthogonal 4×4 DCT having an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two, and
wherein the 4×4 IDCT hardware unit applies the 4×4 IDCT implementation to DCT coefficients representative of media data to transform the media data from a frequency domain to a spatial domain.

In another aspect, a method comprises applying a 4×4 inverse discrete cosine transform (IDCT) with a 4×4 IDCT hardware unit to DCT coefficients representative of media data to transform the media data from a frequency domain to a spatial domain. The IDCT comprises an IDCT of a non-orthogonal 4×4 DCT having an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two.

In another aspect, an apparatus comprises means for applying a 4×4 inverse discrete cosine transform (IDCT) with a 4×4 IDCT hardware unit to DCT coefficients representative of media data to transform the media data from a frequency domain to a spatial domain. The IDCT comprises an IDCT of a non-orthogonal 4×4 DCT having an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two.

In another aspect, a non-transitory computer-readable storage medium stores instructions that, when executed by a processor, cause the processor to apply a 4×4 inverse discrete cosine transform (IDCT) with a 4×4 IDCT hardware unit to DCT coefficients representative of media data to transform the media data from a frequency domain to a spatial domain. The IDCT comprises an IDCT of a non-orthogonal 4×4 DCT having an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two.

The details of one or more aspects of the techniques are set forth in the accompanying drawings and the description below. Other features, objects, and advantages of the techniques described in this disclosure will be apparent from the description and drawings, and from the claims.

DETAILED DESCRIPTION

Figure 1:
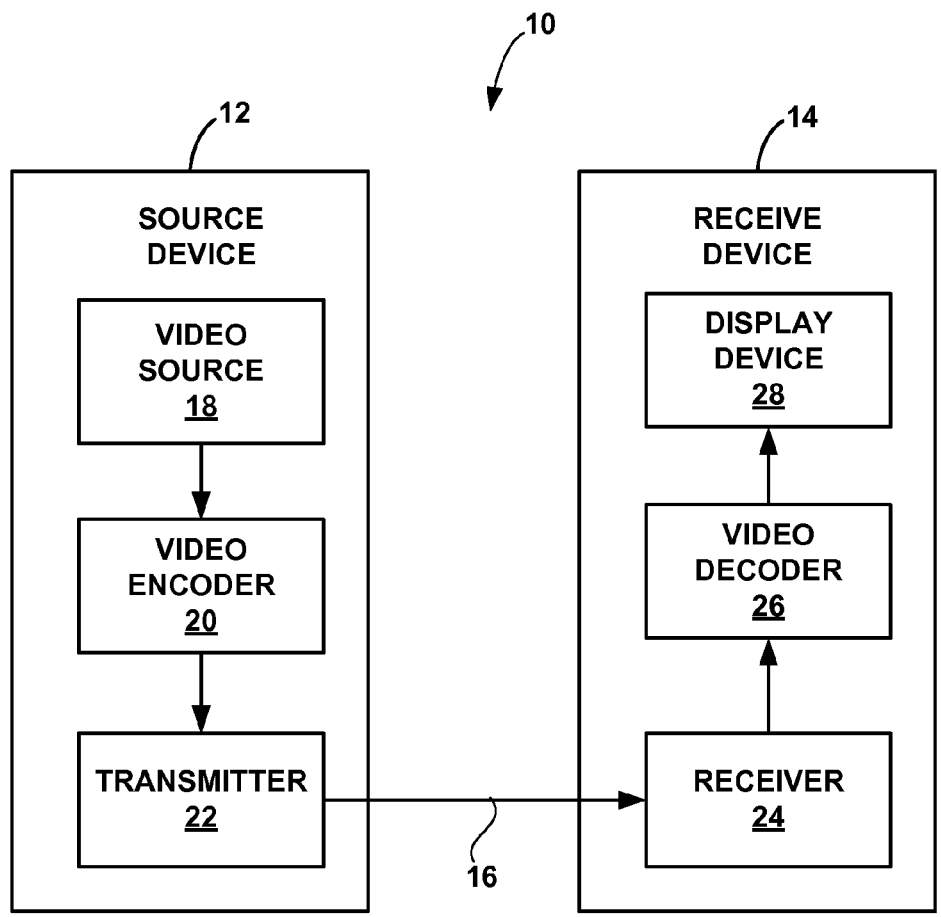
FIG. 1 is a block diagram illustrating a video encoding and decoding system.

In general, this disclosure is directed to techniques for coding data using one or more 4×4 discrete cosine transforms (DCTs) represented as a 4×4 matrix of coefficients selected in accordance with various relationships. The techniques may be applied to compress a variety of data, including visible or audible media data, such as digital video, image, speech, and/or audio data, and thereby transform such electrical signals representing such data into compressed signals for more efficient processing, transmission or archival of the electrical signals. By adhering to the various relationships defined in accordance with the techniques of this disclosure, coefficients may be selected for the coefficient matrixes such that orthogonal and near-orthogonal implementations of 4×4 DCTs, when applied to data, may promote increased coding gain.

The size denoted above, i.e., 4×4, is represented in terms of discrete data units. To illustrate, video data is often described in terms of video blocks, particularly with respect to video compression. A video block generally refers to any sized portion of a video frame, where a video frame refers to a picture or image in a series of pictures or images. Each video block typically comprises a plurality of discrete pixel data that indicates either color components, e.g., red, blue and green, (so-called "chromaticity" or "chroma" components) or luminance components (so-called "luma" components). Each set of pixel data comprises a single 1×1 point in the video block and may be considered a discrete data unit with respect to video blocks. Thus, a 4×4 video block, for example, comprises four rows of pixel data with four discrete sets of pixel data in each row. An n-bit value may be assigned to each pixel to specify a color or luminance value.

DCTs are commonly described in terms of the size of the block of data, whether audio, speech image or video data, the DCT is capable of processing. For example, if a DCT can process a 4×4 block of data, the DCT may be referred to as a 4×4 DCT. Moreover, DCTs may be denoted as a particular type. The most commonly employed type of DCT of the eight different types of DCTs is a DCT of type-II, which may be denoted as "DCT-II." Often, when referring generally to a DCT, such reference refers to a DCT of type-II or DCT-II. The inverse of a DCT-II is referred to as a DCT of type-III, which similarly may be denoted as "DCT-III" or, with the common understanding that DCT refers to a DCT-II, as "IDCT" where the "I" in "IDCT" denotes inverse. Reference to DCTs below conforms to this notation, where general reference to DCTs refers to a DCT-II unless otherwise specified. However, to avoid confusion, DCTs, including DCTs-II, are for the most part referred to below with the corresponding type (II, III, etc.) indicated.

The techniques described in this disclosure involve both an encoder and/or decoder that employ one or more implementations of the 4×4 DCTs-II to facilitate compression and/or decompression of data. Again, the compression and decompression accomplished through applying these 4×4 DCT-II implementations permits physical transformation of electrical signals representing the data such that the signals can be processed, transmitted, and/or stored more efficiently using physical computing hardware, physical transmission media (e.g., copper, optical fiber, wireless, or other media), and/or storage hardware (e.g., magnetic or optical disk or tape, or any of a variety of solid state media). The implementations may be configured solely in hardware or may be configured in a combination of hardware and software.

The implementations of the 4×4 DCTs-II may be orthogonal or near-orthogonal. The term "orthogonal" refers to a property of the matrix in general where the matrix, when multiplied by the transpose of the matrix, equals the identity matrix. The term "near-orthogonal" refers to instances where this orthogonal property is relaxed, such that strict orthogonality is not required. In this respect, "near-orthogonal" suggests approximately or loosely orthogonal. A near-orthogonal matrix, however, does not meet the technical definition of orthogonal and such near-orthogonal matrixes may be considered non-orthogonal from a purely technical perspective.

To illustrate the orthogonal implementation of the 4×4 DCT-II described in this disclosure, consider an apparatus that includes a 4×4 DCT module. The 4×4 DCT module implements an orthogonal 4×4 DCT-II constructed in accordance with the techniques described in this disclosure. This orthogonal 4×4 DCT-II implementation includes an odd portion and an even portion. The so-called "odd portion" of the 4×4 DCT-II refers to a portion of the 4×4 DCT-II implementation that outputs odd numbered coefficients. The so-called "even portion" of the 4×4 DCT-II refers to a portion of the 4×4 DCT-II implementation that outputs even numbered coefficients.

In accordance with the techniques of this disclosure, the odd portion applies first and second internal factors C, S that are related to a scaled factor ($\xi$) such that the scaled factor equals a square root of a sum of a square of the first internal factor (C) plus a square of the second internal factor (S). The term "internal factors" refers to factors internal to the implementation of the 4×4 DCT that remain after factorization. The term "scaled factors" refers to factors external from the implementation of the 4×4 DCT that are removed through factorization.

Internal factors commonly increase implementation complexity by requiring multiplications that may be expensive, in terms of implementation complexity. For example, a multiplication may require three or more times as many computational operations (e.g., clock cycles) to complete than a more simple addition operation. Specific multipliers may be implemented to perform multiplication more efficiently (e.g., in less clock cycles) but these multiplier implementations typically consume significantly more chip or silicon surface area and may also draw large amounts of power. Multiplication by factors is therefore often avoided, particularly in power sensitive devices, such as most mobile devices including cellular phones, so-called "smart" cellular phones, personal digital assistants (PDAs), laptop computers, so-called "netbooks," and the like. Factorization is a process whereby one or more internal factors may be removed from the 4×4 DCT-II implementation and replaced with external factors. The external factors can then be incorporated in subsequent quantization operations, for example, with respect to video encoders, usually with minimal expense or increase in complexity.

In any event, the above relationship between the first and second internal factors C, S and the scaled factor ($\xi$) noted above provides for specific values of the internal factors not used in previous implementations of 4×4 DCTs-II. For example, values for internal factors C and S of 2 and 5, respectively, do not overly increase implementation complexity and improve upon coding gain over known 4×4 DCT implementations involving values of 1 and 2 for C and S. The video encoder then applies the 4×4 DCT-II implementation with internal factors 2 and 5 to media data so as to transform the media data from a spatial domain to a frequency domain. By applying this orthogonal 4×4 DCT-II implementation, the techniques facilitate coding gain (which is a term representative of compression efficiency) when compared to standard DCT-II implementations that include internal factors of 1 and 2.

Orthogonality is generally desired with respect to DCT-II implementations because it is invertible. This invertible property, as one example, allows a video encoder to apply the orthogonal 4×4 DCT implementation to generate DCT coefficients from residual blocks of video data. A video decoder can then apply a 4×4 inverse DCT-II (IDCT) implementation to reconstruct the residual block of video data from the DCT-II coefficients with little if any loss in data. Considering that a main goal of video encoding is the preservation of data, various coding standards, such as H.264 video coding standard adopted an orthogonal implementation of the 4×4 DCT.

While orthogonality is generally desired in theory, the video, audio or general coding pipeline in practice involves a number of steps that introduce so-called "noise" that in most respects effectively prevents the accurate reconstruction of the values provided by orthogonal 4×4 DCT-II implementations. Considering integer-arithmetic implementations, near-orthogonal transforms may improve coding efficiency while also reducing implementation complexity compared to strictly orthogonal integer transforms. In effect, relaxing the orthogonal property introduces noise into the system, but may improve coding gain while also reducing implementation complexity.

To illustrate the near-orthogonal implementation of the 4×4 DCT-II described in this disclosure, consider that the 4×4 DCT module of the apparatus implements this near-orthogonal 4×4 DCT-II that is constructed in accordance with the techniques described in this disclosure. This near-orthogonal 4×4 DCT-II implementation also includes an odd portion and an even portion. The odd portion in this instance applies first and second internal factors (C, S) that are related to a scaled factor ($\xi$) by the following equation:

$$\xi = \frac{C+S}{\omega + \psi}.$$

In this equation, variables $\omega$ and $\psi$ denote original (irrational) internal transform factors, for example, ($\omega$) may be a cosine of three times a constant pi (π) divided by eight, and (ψ) may be a sine of three times the constant pi (π) divided by eight. Variables (C) and (S) denote integer (or dyadic rational) internal transform factors placed instead of (ω) and (ψ).

Equation (2) indicates that the scaled factor (ξ) equals a sum of the first internal factor (C) plus the second internal factor (S) divided by a (ω) plus (ψ). This equation may identify particular internal factors values of C and S similar to the above relationship defined with respect to the orthogonal implementation, but result in a different external factor. However, the different external factor does not typically increase implementation complexity for the reasons noted above, but does generally provide more accurate approximation of the original transform factors. It may also provide improved coding gain over conventional 4×4 DCT-II implementations and even, in some instances, the orthogonal 4×4 DCT-II implementation described above. Consequently, the control unit applies this near-orthogonal 4×4 DCT-II to media data to transform the media data from a spatial domain to a frequency domain with the result of potentially improved coding gain.

FIG. 1 is a block diagram illustrating a video encoding and decoding system 10. As shown in FIG. 1, system 10 includes a source hardware device 12 that transmits encoded video to a receive hardware device 14 via a communication channel 16. Source device 12 may include a video source 18, video encoder 20 and a transmitter 22. Destination device 14 may include a receiver 24, video decoder 26 and video display device 28.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech and audio data. Accordingly, the following discussion of video applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding for spatial, temporal and/or signal-to-noise ratio (SNR) scalability. In some aspects, video encoder 20 and video decoder 22 may be configured to support fine granularity SNR scalability (FGS) coding. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate according to a video compression standard, such as MPEG-2, MPEG-4, ITU-T H.263, or ITU-T H.264/MPEG-4 Advanced Video Coding (AVC). Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, for video broadcasting, the techniques described in this disclosure may be applied to enhance H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099 (the "FLO Specification"), e.g., via a wireless video broadcast server or wireless communication device handset. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive device, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented as least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various dyadic block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can generally provide better resolution, and may be used for locations of a video frame that include higher levels of detail. In general, macroblocks (MBs) and the various sub-blocks may be considered, in general, to represent video blocks. In addition, a slice may be considered to represent a series of video blocks, such as MBs and/or sub-blocks. Each slice may be an independently decodable unit. After prediction, a transform may be performed on dyadic or non-dyadic sized residual blocks, and an additional transform may be applied to the DCT coefficients of the 4×4 blocks for chroma components or luma component if the infra_16×16 prediction mode is used.

Video encoder 20 and/or video decoder 26 of system 10 of FIG. 1 may be configured to include an implementation of a 4×4 DCT-II and an inverse thereof (e.g., a 4×4 DCT-III), respectively, wherein the 4×4 DCT-II adheres to one of the various relationships of the techniques for selecting DCT-II matrix coefficients for a 4×4 sized DCT described in this disclosure. While ITU-T H.264 standard supports intra prediction in various block sizes, such as 16 by 16, 8 by 8, 4 by 4 for luma components, and 8×8 for chroma components, revisions to this standard to improve coding efficiency are currently underway. One revised standard may be referred to as ITU-T H.265 or simply H.265 (sometimes referred to as next generation video coding or NGVC). As described below with respect to FIGS. 7A-7C, 4×4 DCTs of type-II ("DCTs-II") that adhere to one of the various relationships set forth in accordance with the techniques of this disclosure may improve coding efficiency as measured in terms of peak signal-to-noise ratios (PSNRs). Consequently, ITU-T H.265 and other evolving standards or specifications may consider these DCTs-II so as to improve coding efficiency.

In accordance with the techniques described in this disclosure, implementations of 4×4 DCTs-II may be generated in a manner that adheres to one of the various relationships that may promote improved coding gain over conventional implementations. A first relationship is defined for orthogonal implementations of 4×4 DCTs-II and is set forth below with respect to equation (1):

$$\xi = \sqrt{C^2 + S^2}, \quad (1)$$

where C and S denote first and second internal factors in an "odd" portion of the 4×4 DCTs-II implementation and ($\xi$) denotes a scaled factor applied to the "odd" portion of the 4×4 DCTs-II implementation. The so-called "odd portion" of the 4×4 DCT-II refers to a portion of the 4×4 DCT-II implementation that outputs odd numbered coefficients. The so-called "even" portion of the 4×4 DCT-II refers to a portion of the 4×4 DCT-II implementation that outputs even numbered coefficients. The term "internal factors" refers to factors internal to the implementation of the 4×4 DCT that remain after factorization. The term "scaled factors" refers to factors external from the implementation of the 4×4 DCT that are removed through factorization.

Internal factors commonly increase implementation complexity by requiring multiplications that may be expensive, in terms of implementation complexity. For example, a multiplication may require three or more times as many computational operations (e.g., clock cycles) to complete than a more simple addition operation. Specific multipliers may be implemented to perform multiplication more efficiently (e.g., in less clock cycles) but these multiplier implementations typically consume significantly more chip or silicon surface area and may also draw large amounts of power. Multiplication by factors is therefore often avoided, particularly in power sensitive devices, such as most mobile devices including cellular phones, so-called "smart" cellular phones, personal digital assistants (PDAs), laptop computers, so-called "netbooks," and the like. Factorization is a process whereby one or more internal factors may be removed from the 4×4 DCT-II implementation and replaced with external factors. The external factors can then be incorporated in subsequent quantization operations, for example, with respect to video encoders, usually with minimal expense or increase in complexity.

In any event, the above relationship between the first and second internal factors C, S and the scaled factor ($\xi$) noted above with respect to equation (1) provides for specific values of the internal factors not used in previous implementations of 4×4 DCTs-II. For example, values for internal factors C and S of 2 and 5, respectively, do not overly increase implementation complexity and improve upon coding gain over known 4×4 DCT implementations involving values of 1 and 2 for C and S. The video encoder then applies the 4×4 DCT-II implementation with internal factors 2 and 5 to media data so as to transform the media data from a spatial domain to a frequency domain. By applying this orthogonal 4×4 DCT-II implementation, the techniques facilitate coding gain (which is a term representative of compression efficiency) when compared to standard DCT-II implementations that include internal factors of 1 and 2.

Orthogonality is generally desired with respect to DCT-II implementations because it is invertible. This invertible property, as one example, allows a video encoder to apply the orthogonal 4×4 DCT implementation to generate DCT coefficients from residual blocks of video data. A video decoder can then apply a 4×4 inverse DCT-II (IDCT) implementation to reconstruct the residual block of video data from the DCT-II coefficients with little if any loss in data. Several coding standards, such as the H.264 video coding standard, adopted an orthogonal implementation of the 4×4 DCT.

While orthogonality is generally desired in theory, the video, audio or general coding pipeline in practice involves a number of additional steps (such as scaling or quantization) that introduce so-called "noise" that in most respects effectively prevents the accurate reconstruction of the values provided by orthogonal 4×4 DCT-II implementations. As a result, relaxing the orthogonal property to achieve a near-orthogonal (which is non-orthogonal technically speaking) may be possible. Considering integer-arithmetic implementations, such near-orthogonal transforms may improve coding efficiency while also reducing implementation complexity compared to strictly orthogonal integer transforms. In general, relaxing the orthogonal property introduces noise into the system, but may improve coding gain while also reducing implementation complexity.

To illustrate the near-orthogonal implementation of the 4×4 DCT-II, consider an apparatus that includes a control unit, as one example. The control unit implements the near-orthogonal 4×4 DCT-II in accordance with the techniques described in this disclosure. This near-orthogonal 4×4 DCT-II implementation also includes an odd portion and an even portion. The odd portion in this instance applies first and second internal factors (C, S) that are related to a scaled factor (ξ) by the following equation (2):

$$\xi = \frac{C+S}{\omega+\psi}. \tag{2}$$

In equation (2) variables ω and ψ denote original (irrational) internal transform factors, for example, (ω) may be a cosine of three times a constant pi (π) divided by eight, and (ψ) may be a sine of three times the constant pi (π) divided by eight. Variables (C) and (s) denote integer (or dyadic rational) internal transform factors placed instead of (ω) and (ψ).

Equation (2) indicates that the scaled factor (ξ) equals a sum of the first internal factor (C) plus the second internal factor (S) divided by a (ω) plus (ψ). This equation may identify particular internal factors values of C and S similar to the above relationship defined with respect to the orthogonal implementation, but result in a different external factor. However, the different external factor does not typically increase implementation complexity for the reasons noted above, but does generally provide more accurate approximation of the original transform factors. It may also provide improved coding gain over conventional 4×4 DCT-II implementations and even, in some instances, the orthogonal 4×4 DCT-II implementation described above. Consequently, the control unit applies this near-orthogonal 4×4 DCT-II to media data to transform the media data from a spatial domain to a frequency domain with the result of potentially improved coding gain.

The above resulting 4×4 DCTs-II implementations constructed in accordance with the techniques described in this disclosure represent scaled 4×4 DCT-II implementations as opposed to straight 4×4 DCT-II implementations. The implementations are "scaled" in that they have undergone factorization to remove internal factors and therefore output scaled coefficients that require additional external factors be applied to correctly calculate the 4×4 DCT. So-called "straight" DCT-II implementations output coefficients that do not require any further operations, such as multiplication by external factors, to correctly calculate the 4×4 DCT.—

There are a number of different factorizations capable of producing scaled 4×4 DCT-II implementations. One alternative factorization produces a different scaled 4×4 DCT-II implementation from which another relationship can be derived in accordance with the techniques of this disclosure to produce a near-orthogonal implementation that improves coding gain over conventional DCTs-II commonly employed by video encoders that comply with H.264.

To illustrate the near-orthogonal implementation with respect to the alternative factorization to produce a scaled 4×4 DCT-II, consider an apparatus that includes a control unit, as one example. The control unit implements the near-orthogonal 4×4 DCT-II in accordance with the techniques described in this disclosure. This near-orthogonal 4×4 DCT-II implementation includes an odd portion and an even portion similar to the implementations described above. The odd portion in this instance applies first and second internal factors (A, B) that are related to a scaled factor (ξ) by the following equation (3):

$$\xi = \frac{A+B}{1+1/\sqrt{2}}. \tag{3}$$

Equation (3) indicates that the scaled factor (ξ) equals a sum of the first internal factor (A) plus the second internal factor (B) divided by a one plus one divided by the square root of two. This equation may identify particular values of 7 and 5 for internal factors A and B, respectively. This resulting near-orthogonal 4×4 DCT-II implementation constructed using the alternative factorization and with the above noted internal factors may more accurately represent the irrational internal factors of a straight 4×4 DCT-II than conventional H.264 4×4 DCT-II implementations and thereby provide improved coding gain over conventional 4×4 DCT-II implementations. Consequently, the control unit applies this near-orthogonal 4×4 DCT-II to media data to transform the media data from a spatial domain to a frequency domain with the result of potentially improved coding gain.

Figure 2:
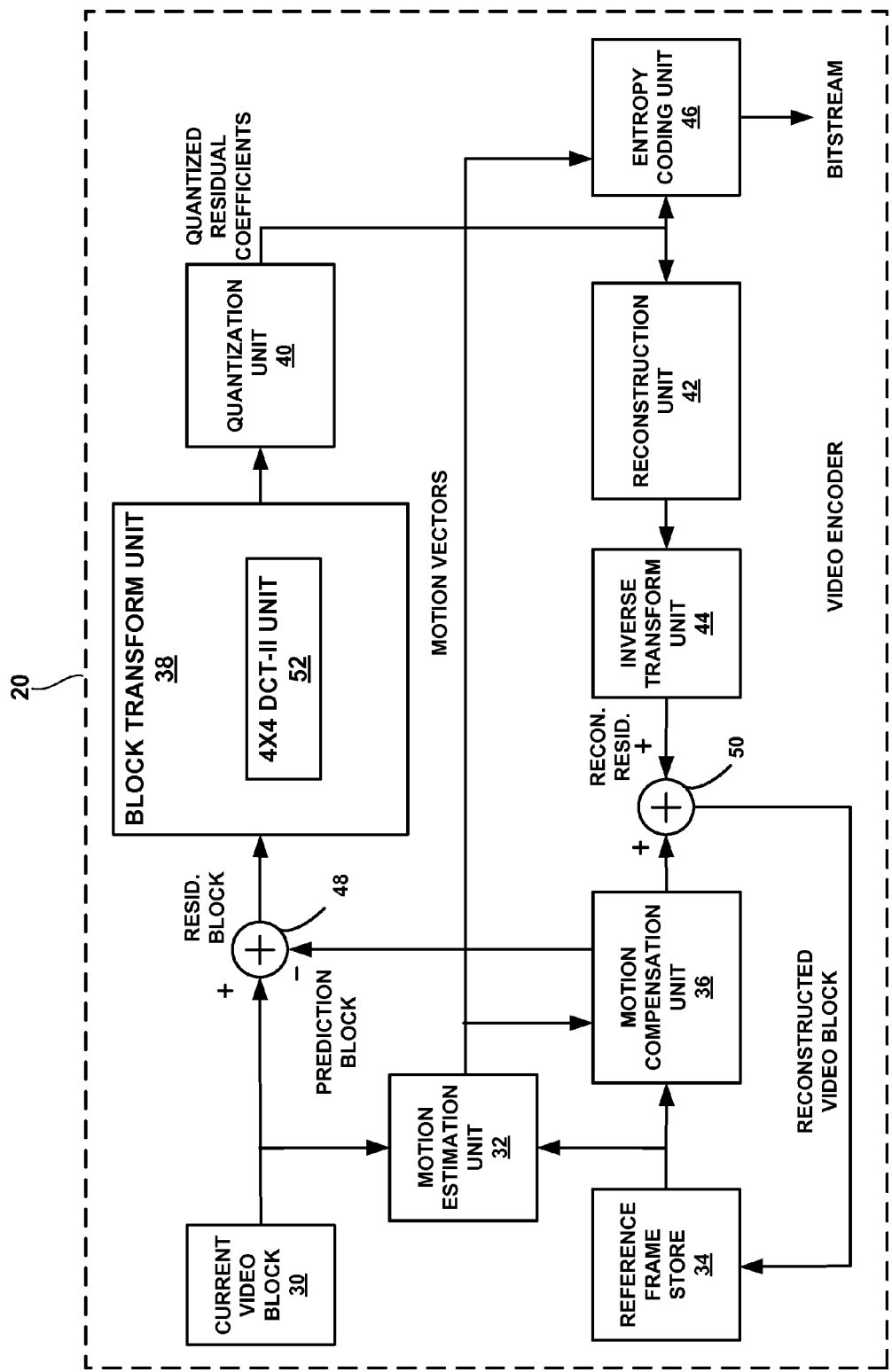
FIG. 2 is a block diagram illustrating the video encoder of FIG. 1 in more detail.

FIG. 2 is a block diagram illustrating video encoder 20 of FIG. 1 in more detail. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, reference frame store 34, motion compensation unit 36, block transform unit 38, quantization unit 40, inverse quantization unit 42, inverse transform unit 44 and entropy coding unit 46. An in-loop or post loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bidirectional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform producing residual transform block coefficients. As shown in FIG. 2, block transform unit 38 includes a 4×4 DCT-II unit 52 that implements a 4×4 DCT-II constructed in accordance with the techniques described in this disclosure. 4×4 DCT-II unit 52 represents a hardware module, which in some instances executes software (such as a digital signal processor or DSP executing software code or instructions), that implements a 4×4 DCT-II having internal factors defined by one of the three relationships identified above. Block transform unit 38 applies scaled 4×4 DCT-II unit 52 to the residual block to produce a 4×4 block of residual transform coefficients. 4×4 DCT-II unit 52 generally transforms the residual block from the spatial domain, which is represented as residual pixel data, to the frequency domain, which is represented as DCT coefficients. The transform coefficients may comprise DCT coefficients that include at least one DC coefficient and one or more AC coefficients.

Quantization unit 40 quantizes (e.g., rounds) the residual transform block coefficients to further reduce bit rate. As mentioned above, quantization unit 40 accounts for the scaled nature of scaled 4×4 DCT-II unit 52 by incorporating internal factors removed during factorization. That is, quantization unit 40 incorporates the external factor shown below with respect to implementations 70A-70C of FIGS. 4A-4C. As quantization typically involves multiplication, incorporating these factors into quantization unit 40 may not increase the implementation complexity of quantization unit 40. In this respect, removing the factors from scaled 4×4 DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding. Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. To illustrate, entropy coding unit 46 may select a short codeword (in terms of bits) for frequently occurring quantized DCT coefficients and longer codeword (in term of bits) for less frequently occurring quantized DCT coefficients. So long as the short codeword uses less bits than the quantized DCT coefficients, on average entropy coding unit 46 compresses the quantized DCT coefficients. Entropy coding unit 46 outputs the entropy coded coefficients as a bitstream which is sent to video decoder 26. In general, video decoder 26 performs inverse operations to decode and reconstruct the encoded video from the bitstream, as will be described with reference to the example of FIG. 3.

Reconstruction unit 42 and inverse transform unit 44 reconstruct quantized coefficients and apply inverse transformation, respectively, to reconstruct the residual block. Summation unit 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 3:
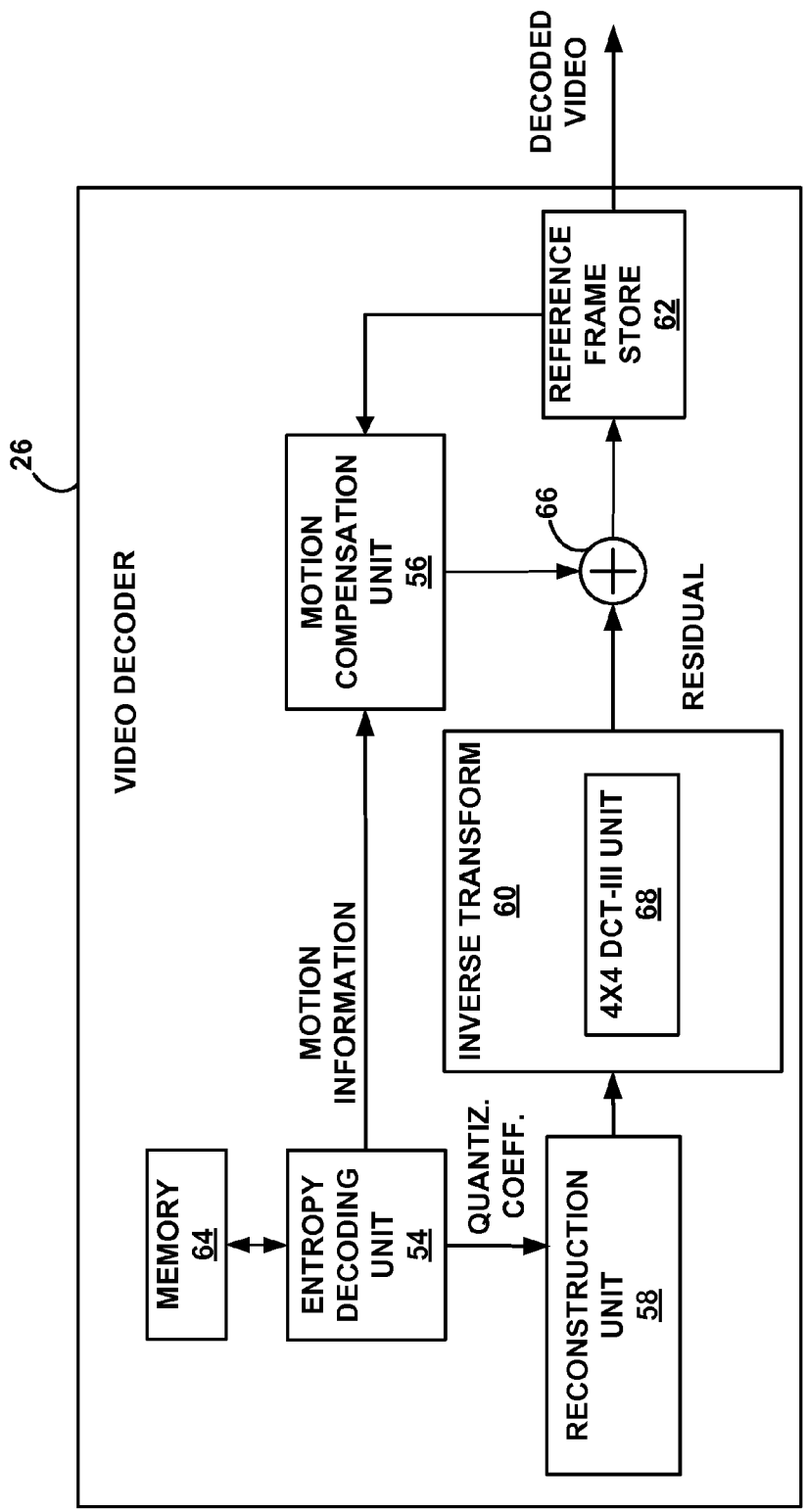
FIG. 3 is a block diagram illustrating the video decoder of FIG. 1 in more detail.

FIG. 3 is a block diagram illustrating an example of video decoder 26 of FIG. 1 in more detail. Video decoder 26 may be formed at least in part as one or more integrated circuit devices, which may be referred to collectively as an integrated circuit device. In some aspects, video decoder 26 may form part of a wireless communication device handset. Video decoder 26 may perform intra- and inter-decoding of blocks within video frames. As shown in FIG. 3, video decoder 26 receives an encoded video bitstream that has been encoded by video encoder 20. In the example of FIG. 3, video decoder 26 includes entropy decoding unit 54, motion compensation unit 56, reconstruction unit 58, inverse transform unit 60, and reference frame store 62. Entropy decoding unit 64 may access one or more data structures stored in a memory 64 to obtain data useful in coding. Video decoder 26 also may include an in-loop deblocking filter (not shown) that filters the output of summer 66. Video decoder 26 also includes summer 66. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 54 receives the encoded video bitstream and decodes from the bitstream quantized residual coefficients and quantized parameters, as well as other information, such as macroblock coding mode and motion information, which may include motion vectors and block partitions. Motion compensation unit 56 receives the motion vectors and block partitions and one or more reconstructed reference frames from reference frame store 62 to produce a prediction video block.

Reconstruction unit 58 inverse quantizes, i.e., de-quantizes, the quantized block coefficients. Inverse transform unit 60 applies an inverse transform, e.g., an inverse DCT, to the coefficients to produce residual blocks. More specifically, inverse transform unit 60 includes a scaled 4×4 DCT-III unit 68, which inverse transform unit 60 applies to the coefficients to produce residual blocks. Scaled 4×4 DCT-III unit 68, which is the inverse of scaled 4×4 DCT-II unit 52 shown in FIG. 2, may transform the coefficients from the frequency domain to the spatial domain to produce the residual blocks. Similar to quantization unit 40 above, reconstruction unit 58 accounts for the scaled nature of 4×4 DCT-III unit 68 by incorporating the external factors removed during factorization into the reconstruction process with little if any increase in implementation complexity. Removing factors from scaled 4×4 DCT-III unit 68 may reduce implementation complexity, thereby resulting in a net decrease of complexity for video decoder 26.

The prediction video blocks are then summed by summer 66 with the residual blocks to form decoded blocks. A deblocking filter (not shown) may be applied to filter the decoded blocks to remove blocking artifacts. The filtered blocks are then placed in reference frame store 62, which provides reference frame for decoding of subsequent video frames and also produces decoded video to drive display device 28 (FIG. 1).

Figure 4A:
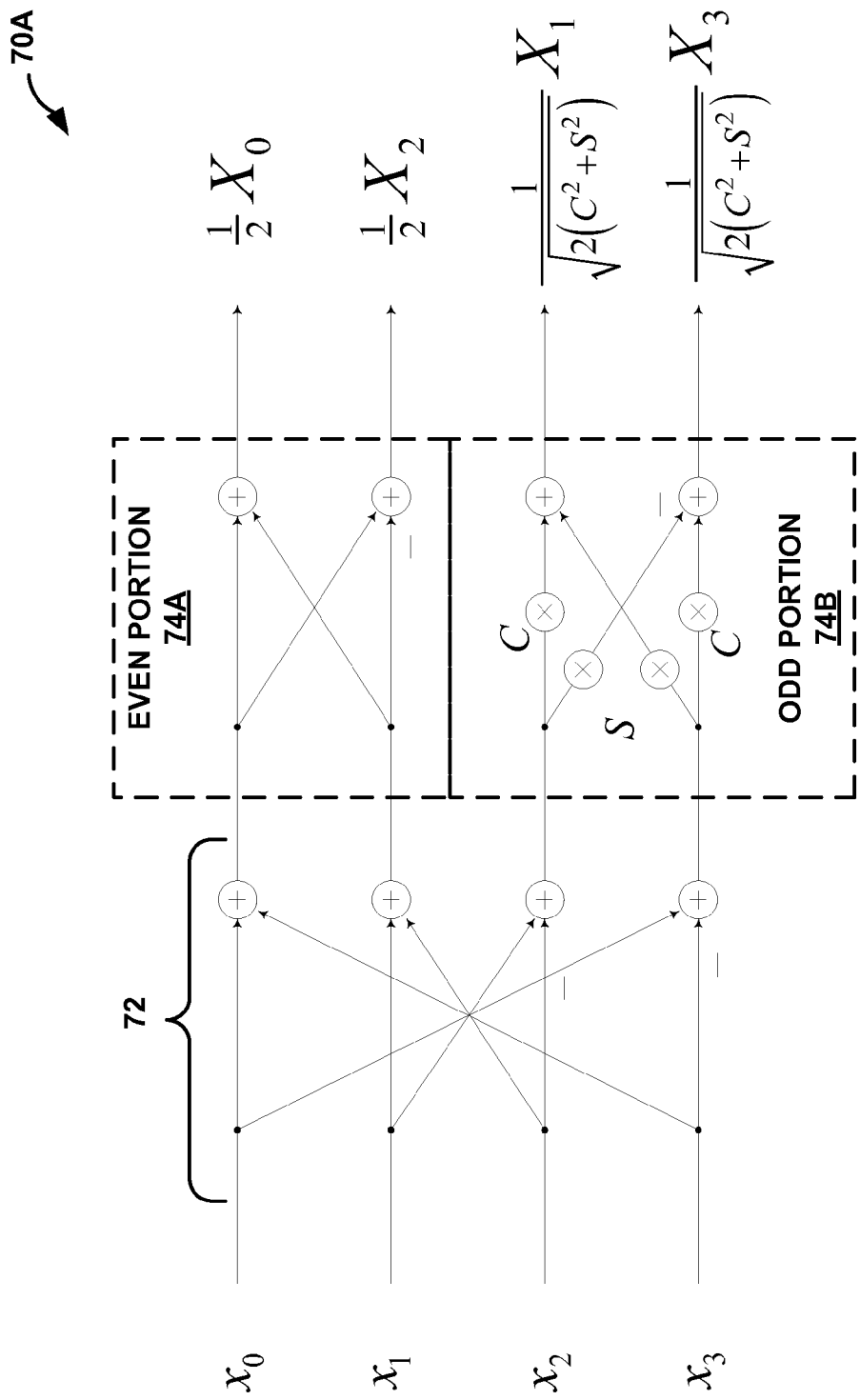
FIGS. 4A-4C are diagrams that each illustrates an implementation of a scaled 4×4 DCT-II constructed in accordance with the techniques of this disclosure.
Figure 4B:
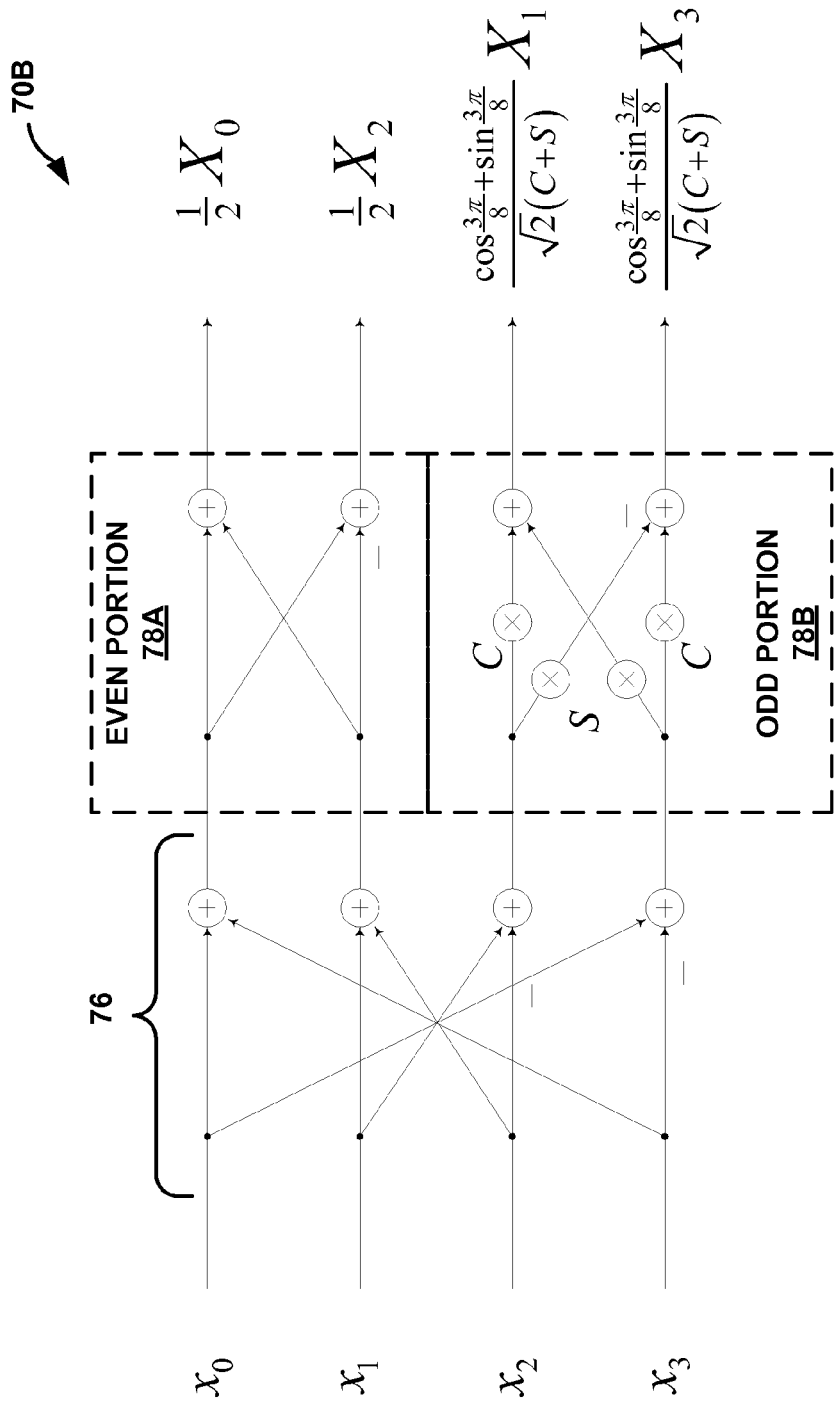
Figure 4C:
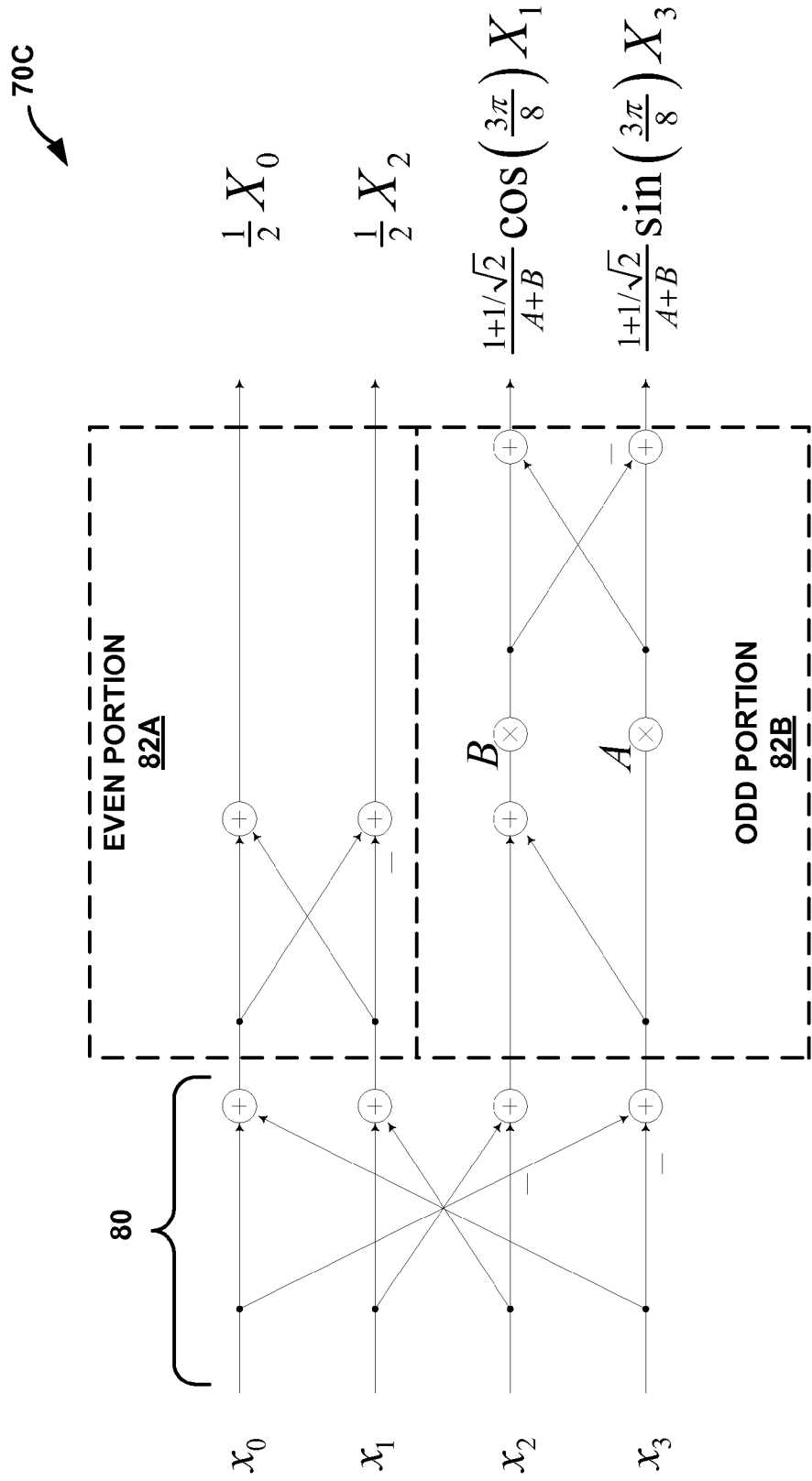

FIGS. 4A-4C are diagrams that each illustrate an implementation of a scaled 4×4 DCT-II constructed in accordance with the techniques of this disclosure. FIG. 4A is a diagram that illustrates a scaled orthogonal 4×4 DCT-II implementation 70A constructed in accordance with the techniques of this disclosure. FIG. 4B is a diagram that illustrates a scaled near-orthogonal 4×4 DCT-II implementation 70B constructed in accordance with the techniques of this disclosure. FIG. 4C is a diagram that illustrates a scaled near-orthogonal 4×4 DCT-II alternative implementation 70C constructed in accordance with the techniques of this disclosure. 4×4 DCT unit 52 shown in the example of FIG. 2 may incorporate one or more these implementations 70A-70C.

Referring first to the example of FIG. 4A, 4×4 DCT-II implementation 70A includes a butterfly unit 72, an even portion 74A and an odd portion 74B. Butterfly unit 92 may represent hardware or a combination of hardware and software for routing or otherwise forwarding inputs $x_0, \ldots, x_3$ to proper even and odd portions 74A, 47B ("portions 74"). Butterfly unit 92 usually combines the result of smaller DCTs, such as 2×2 DCT-II implementations, which in this case may be represented by even and odd portions 74, respectively. Even portion 74A is a 2×2 portion of 4×4 DCT-II implementation 70A that outputs even DCT coefficients $X_0$ and $X_2$. Notably, these even coefficients $X_0$ and $X_2$ are multiplied by an external factor of a half (½), which can be and usually is applied by quantization unit 40.

Odd portion 74B is a 2×2 portion of 4×4 DCT-II implementation 70A that outputs odd DCT coefficients $X_1$ and $X_3$. Odd portion 74B includes two internal factors denoted C and S, which are related to an external factor applied to odd coefficients $X_1$ and $X_3$ by the above noted equation (1), which is defined in accordance with the techniques of this disclosure. The additional external factor of one divided by the square root of two (1/√2) is multiplied by one divided by the relationship noted in equation (1) above to result in the external factor shown with respect to odd coefficients $X_1$ and $X_3$.

The relationship noted in equation (1) can be derived by first considering the orthogonal property, which is set forth mathematically by the following equation (4):

$$C^T C = I. \tag{4}$$

The variable C in this instance refers to any matrix, while $C^T$ denotes the transpose of the matrix C. The variable I denotes an identity matrix. Thus, a matrix exhibits orthogonal property if the transpose of the matrix times the matrix itself equals the identity matrix.

Assuming a scaled matrix, which is preferred in media coding implementations for the reasons noted above, the matrix C can be split into an integer scaled transform denoted C' and a diagonal matrix of scale factors or external factors D, as noted in the following equation (5):

$$C = C'D. \tag{5}$$

Substituting C'D from equation (5) for C in equation (4) results in the following equation (6):

$$(C'D)^T(C'D) = DC'^T C'D = I, \tag{6}$$

which can be simplified to the mathematical equation shown in the following equation (7):

$$C'^T C' = D^{-2}. \tag{7}$$

Equation (7) provides a mechanism for choosing scaling factors such that the resulting integer transform remains orthogonal.

For example, in the case of 4×4 DCT-II implementations, this DCT-II usually only applies approximations of factors representative of the cosine of three times the constant pi divided by eight and the sine of three times the constant pi divided by eight. Assuming that these two factors are to be replaced by integers C and S, which are coefficients of the matrix C', and using the above orthogonality condition, equation (1) above denotes the normalization factor, such that the task of designing an orthogonal approximation of 4×4 DCT-II may be limited to finding pairs of integers (C, S), such that the following equations (8) and (9) are satisfied:

$$\frac{C}{\sqrt{C^2 + S^2}} \approx \cos\left(\frac{3\pi}{8}\right), \text{ and} \tag{8}$$

$$\frac{S}{\sqrt{C^2 + S^2}} \approx \sin\left(\frac{3\pi}{8}\right). \tag{9}$$

Under these assumptions, the integer scaled transform shown as 4×4 DCT-II implementation 70A results.

The following Table 1 illustrates various values selected for the integers of C and S and the resulting approximation errors in comparison to the 4×4 DCT-II implementation adopted in the H.264 video coding standard.

TABLE 1

| Parameters | | | Approximation errors | | | |
|---|---|---|---|---|---|---|
| C | S | $\sqrt{C^2 + S^2}$ | $\cos\left(\frac{3\pi}{8}\right) - \frac{C}{\sqrt{C^2+S^2}}$ | $\sin\left(\frac{3\pi}{8}\right) - \frac{S}{\sqrt{C^2+S^2}}$ | Complexity (x*C, y*S) | Comments |
| 1 | 2 | $\sqrt{5}$ | −0.0645302 | 0.0294523 | 1 shift | adopted in H.264 |
| 2 | 5 | $\sqrt{29}$ | 0.0112928 | −0.00459716 | 1 add + 2 shs | +2-bits in dyn. Range |
| 3 | 7 | $\sqrt{58}$ | −0.0112359 | 0.0047345 | 2 adds + 1 sh | +3-bits in dyn. Range |
| 5 | 12 | 13 | −0.00193195 | 0.000802609 | 2 adds + 2 shs | +4-bits in dyn. Range |
| 17 | 41 | $\sqrt{1970}$ | −0.00033159 | 0.000137419 | 3 adds + 2 shs | +5-bits in dyn. Range |

Notably, when the variables C and S are set to 2 and 5 respectively, the complexity of the resulting implementation 70A increases but there is much less error in the approximations of the cosine of three times the constant pi divided by eight and the sine of three times the constant pi divided by eight, which promotes coding gain. The complexity involves only an additional addition and shift when compared to the base H.264 implementation, but does not involve any expensive, in the sense of operations, multiplications. Consequently, the techniques described in this disclosure promote increased coding gain with only minor increases in complexity, with implementation 70A incorporating values of 2 and 5 for variables C and S respectively providing potentially the best coding gain with minimal increases to implementation complexity.

While described above with respect to a DCT of type II, implementation 70A shown in the example of FIG. 4A may also represent a DCT of type III or inverse DCT implementation. Forming an inverse DCT from implementation 70A involves reversing the inputs and the outputs such that inputs are received by the implementation on the right of FIG. 4A and outputs are output at the left of the implementation. Inputs are then processed by even and odd portions 74 first and then by butterfly 72 before being output on the left. For ease of illustration purposes, this IDCT implementation that is inverse to implementation 70A is not shown in a separate figure considering that such an implementation may be described as a mirror image of implementation 70A.

FIG. 4B is a diagram that illustrates a scaled near-orthogonal 4×4 DCT-II implementation 70B constructed in accordance with the techniques of this disclosure. 4×4 DCT-II implementation 70B includes a butterfly unit 76, which is similar to butterfly unit 72 of FIG. 4A, and even and odd portions 78A, 78B ("portions 78"). Even portion 78A is similar to even portion 74A. Odd portion 78B is also similar to odd portion 74B except that the orthogonality condition has been relaxed, leading to a different relationship, i.e., the relationship denoted above with respect to equation (2), between internal factors C, S and scaled factor $\xi$.

To derive example implementation 70B of FIG. 4B in accordance with the relationship denoted by equation (2), first consider that, while orthogonality generally ensures a straightforward inverse implementation of 4×4 DCT-II in theory, in practice most scale factors (following integer transforms) become irrational numbers, which are hard to implement precisely using an integer multiplier. Moreover, quantization generally follows application of 4×4 DCT transforms and this quantization adds noise which may prevent a straightforward application of the inverse orthogonal DCT-II implementation. Moreover, considering integer-arithmetic implementations, such near-orthogonal transforms may improve coding efficiency while also reducing implementation complexity compared to strictly orthogonal integer transforms. Consequently, relaxing the degree of such orthogonality mismatch between the straight and inverse implementations may actually improve coding gain.

To characterize the degree of mismatch, a norm of distance from the identity matrix is defined in accordance with the following equation (10):

$$\|C^T C - I\|. \tag{10}$$

Using the same notation as that above with respect to equation (4), equation (10) simply indicates a norm of distance from the identity matrix can be defined as the transpose of the matrix time the matrix minus the identity matrix. Assuming that $C^T C$ remains diagonal, the average absolute distance can be computed in accordance with the following equation (11):

$$\delta_N = \frac{1}{N} tr(|C^T C - I|). \tag{11}$$

where the average absolute distance is denoted by the variable $\delta_N$ and N equals the size of the matrix.

By relaxing the orthogonality property, coding gain may improve but analysis of coding gain with respect to the average absolute difference is too dependent on a particular model or statistics of image undergoing compression. Consequently, the extent to which to relax the orthogonality property may be determined through analysis of a different metric related to finding integer transforms that are potentially best in terms of matching basis functions of DCT-II. More information regarding this form of evaluation can be found in an article authored by Y. A. Reznik, A. T. Hinds, and J. L. Mitchell, entitled "Improved Precision of Fixed-Point Algorithms by Means of Common Factors," Proc. ICIP 2008, San Diego, Calif., the entire contents of which are incorporated by reference as if fully set forth herein.

From this incorporated reference, one technique for producing best matching design is referred to as a "common-factor-based approximation." Using this techniques, the following equation (12) can be derived as follows:

$$\xi = \frac{C+S}{\cos\left(\frac{3\pi}{8}\right) + \sin\left(\frac{3\pi}{8}\right)}, \tag{12}$$

such that the following equations (13) and (14) may be derived as follows:

$$C/\xi \approx \cos\left(\frac{3\pi}{8}\right), \text{ and} \tag{13}$$

$$S/\xi \approx \sin\left(\frac{3\pi}{8}\right). \tag{14}$$

Equation (12) ensures that, for scaled factor $\xi$, the errors of corresponding approximation for C and S are in the same magnitude but sign-opposite. Under these assumptions, the integer scaled transform shown as 4×4 DCT-II implementation 70B results.

The following Table 2 illustrates various values selected for the integers of C and S and the resulting approximation errors.

TABLE 2

| Parameters | | | Approximation errors | | | |
|---|---|---|---|---|---|---|
| C | S | $\xi = \frac{C+S}{\cos\left(\frac{3\pi}{8}\right) + \sin\left(\frac{3\pi}{8}\right)}$ | $\cos\left(\frac{3\pi}{8}\right) - C/\xi$ | $\sin\left(\frac{3\pi}{8}\right) - S/\xi$ | $\frac{C^2+S^2}{\xi^2} - 1$ | Bit-depth expansion due to factors C,S |
| 1 | 2 | 2.296100594 | −0.0528375558 | 0.0528375558 | −0.0516073433 | 1-bit |
| 2 | 5 | 5.357568053 | 0.0093797282 | −0.0093797282 | 0.010328504 | 2-bits |
| 5 | 12 | 13.01123670 | −0.0015997926 | 0.0015997926 | −0.0017264839 | 4-bits |

Considering Table 2 in more detail, when the variables C and S are set to 2 and 5 respectively, the approximation errors are reduced. The third error metric $(C^2+S^2/\xi^2-1)$ shown above under the heading of "Approximation errors" is essentially a subset of orthogonality mismatch metric $\delta_N$ discussed above with respect to equation (11), where this mismatch metric describes values appearing at the odd positions along the diagonal of $C^T C - I$. Notably, more precise integer approximations to the DCT-II basis functions are also generally closer to being orthogonal. While such integer approximation are generally closer to being orthogonal, DCT-II implementation 70B with C and S set to values of 1 and 2, respectfully, provides possibly the most return of those listed in terms of coding gain, as shown below with respect to FIG. 7B.

While described above with respect to a DCT of type II, implementation 70B shown in the example of FIG. 4B may also represent a DCT of type III or inverse DCT implementation. Forming an inverse DCT from implementation 70B involves reversing the inputs and the outputs such that inputs are received by the implementation on the right of FIG. 4B and outputs are output at the left of the implementation. Inputs are then processed by even and odd portions 78 first and then by butterfly 76 before being output on the left. For ease of illustration purposes, this IDCT implementation that is inverse to implementation 70B is not shown in a separate figure considering that such an implementation may be described as a mirror image of implementation 70B.

FIG. 4C is a diagram that illustrates another exemplary scaled near-orthogonal 4×4 DCT-II implementation 70C constructed in accordance with the techniques of this disclosure that results from an alternative factorization. 4×4 DCT-II implementation 70C includes a butterfly unit 80, which is similar to butterfly unit 72 of FIG. 4A and butterfly unit 76 of FIG. 4B, and even and odd portions 82A, 82B ("portions 82"). Even portion 82A is similar to even portion 78A. Odd portion 82B is similar to odd portion 78B in that the orthogonality condition has been relaxed, but as a result of the alternative factorization, a different relationship, i.e., the relationship denoted above with respect to equation (3), between internal factors A, B and scaled factor $\xi$ results. More information regarding the alternative factorization can be found in an article authored by Y. A. Reznik, and R. C. Chivukula, entitled "On Design of Transforms for High-Resolution/High-Performance Video Coding," MPEG input document M16438, presented at MPEG's 88th meeting, in Maui, Hi., in April 2009, the entire contents of which are hereby incorporated by reference as if fully set forth herein.

Notably, different scale factors are applied to odd coefficients $X_1$ and $X_3$, and there is only one irrational factor to approximate in 4×4 DCT-II implementation 70C. To remain orthogonal, the internal factor B usually must be set to one divided by the square root of two and A must be set to one. Consequently, changing the values internal factors A, B from these values leads to a non-orthogonal implementation. To evaluate various values of these internal factors, the above techniques referred to as the common factor approximation techniques, which is noted above with respect to FIG. 4B, are employed. Using this techniques, the following equation (15) is determined so that two integer values can be selected for internal factors A, B to derive parameter:

$$\xi = \frac{A+B}{1+1/\sqrt{2}}, \qquad (15)$$

such that the following equations (16) and (17) are satisfied:

$$A/\xi \approx 1, \text{ and} \qquad (16)$$

$$B/\xi \approx 1/\sqrt{2}. \qquad (17)$$

The above equation (15) ensures that errors of the corresponding approximations become balanced in magnitude but opposite in signs. Under these assumptions, the integer scaled transform shown as 4×4 DCT-II implementation 70C results.

The following Table 3 illustrates various values selected for the integers of C and S and the resulting approximation errors.

TABLE 3

| Parameters | | | Approximation errors | | | |
|---|---|---|---|---|---|---|
| A | B | $\xi = \dfrac{A+B}{1+1/\sqrt{2}}$ | $1 - A/\xi$ | $1/\sqrt{2} - B/\xi$ | $\lVert C^T C - I \rVert_\infty$ | Bit-depth expansion due to factors A,B |
| 3 | 2 | 2.928932188 | −0.0242640686 | 0.0242640686 | 0.067451660 | 2-bits |
| 7 | 5 | 7.029437252 | 0.0041877111 | −0.0041877111 | 0.011879709 | 3-bits |
| ... | ... | ... | ... | ... | ... | ... |
| 29 | 41 | 41.00505064 | 0.0001231711 | −0.0001231711 | 0.000348411 | 6-bits |

Considering Table 3 in more detail, when the variables A and B are set to 7 and 5 respectively, the approximation errors are reduced. 4×4 DCT-II implementation 70C with A and B set to values of 7 and 5, respectfully, provides possibly the most return of those listed in terms of coding gain in comparison to complexity increase (which is not shown in Table 3), as shown below with respect to FIG. 7C.

While described above with respect to a DCT of type II, implementation 70C shown in the example of FIG. 4C may also represent a DCT of type III or inverse DCT implementation. Forming an inverse DCT from implementation 70C involves reversing the inputs and the outputs such that inputs are received by the implementation on the right of FIG. 4C and outputs are output at the left of the implementation. Inputs are then processed by even and odd portions 82 first and then by butterfly 80 before being output on the left. For ease of illustration purposes, this IDCT implementation that is inverse to implementation 70C is not shown in a separate figure considering that such an implementation may be described as a mirror image of implementation 70C.

Figure 5:
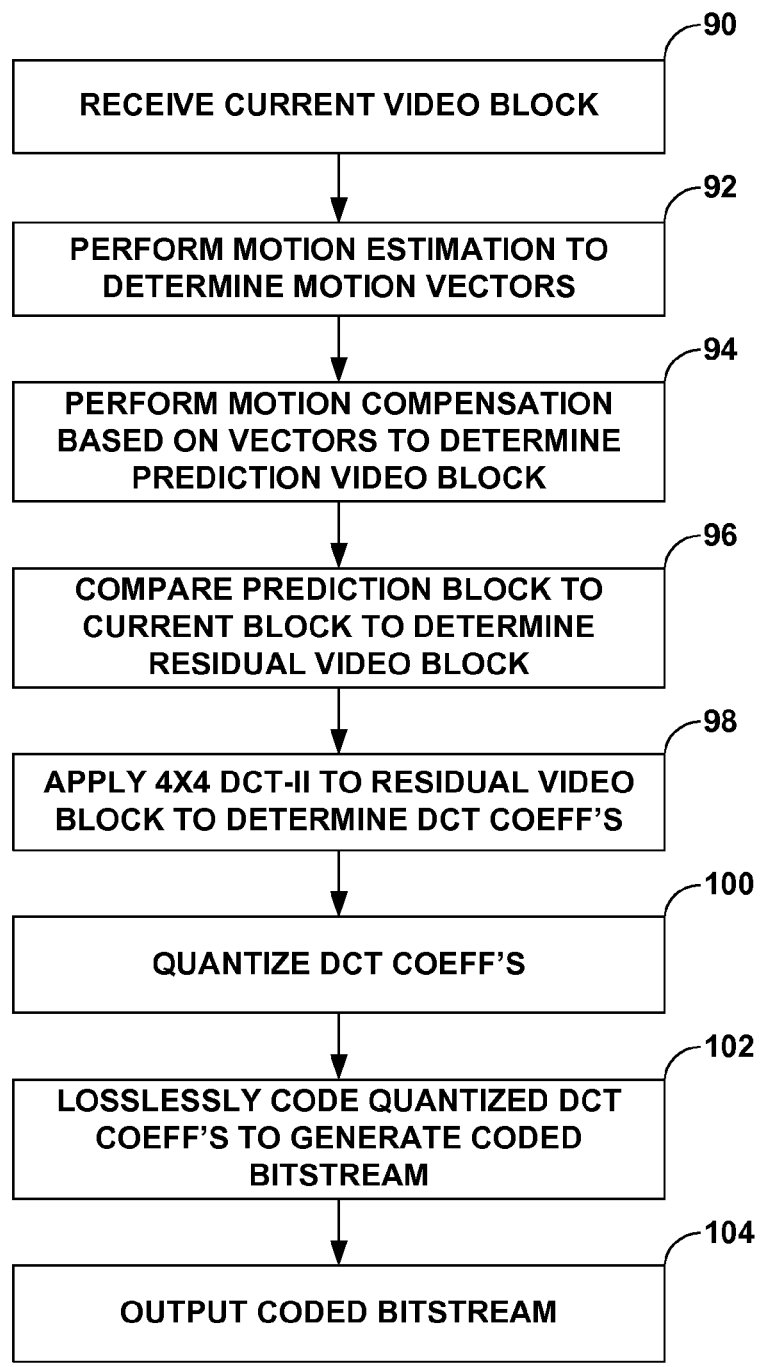
FIG. 5 is a flow chart illustrating exemplary operation of a coding device in applying a 4×4 DCT implementation constructed in accordance with the techniques of this disclosure.

FIG. 5 is a flow chart illustrating exemplary operation of a coding device, such as video encoder 20 of FIG. 2, in applying a 4×4 DCT implementation constructed in accordance with the techniques of this disclosure. Initially, video encoder 20 receives a current video block 30 within a video frame to be encoded (90). Motion estimation unit 32 performs motion estimation to compare video block 30 to blocks in one or more adjacent video frames to generate one or more motion vectors (92). The adjacent frame or frames may be retrieved from reference frame store 34. Motion estimation may be performed for blocks of variable sizes, e.g., 16×16, 16×8, 8×16, 8×8, 4×4 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bidirectional prediction. Using the resulting block partitions and motion vectors, motion compensation unit 36 forms a prediction video block (94).

Video encoder 20 forms a residual video block by subtracting the prediction video block produced by motion compensation unit 36 from the original, current video block 30 at summer 48 (96). Block transform unit 38 applies a transform producing residual transform block coefficients. Block transform unit 38 includes a 4×4 DCT-II unit 52 generated in accordance with the techniques described in this disclosure. Block transform unit 38 applies scaled 4×4 DCT-II unit 52 to the residual block to produce a 4×4 block of residual transform coefficients. 4×4 DCT-II unit 52 generally transforms the residual block from the spatial domain, which is represented as residual pixel data, to the frequency domain, which is represented as DCT coefficients (98). The transform coefficients may comprise DCT coefficients that include at least one DC coefficient and one or more AC coefficients.

Quantization unit 40 quantizes (e.g., rounds) the residual transform block coefficients to further reduce bit rate (100). As mentioned above, quantization unit 40 accounts for the scaled nature of scaled 4×4 DCT-II unit 52 by incorporating internal factors removed during factorization. That is, quantization unit 40 incorporates the external factor noted above with respect to implementations 70A-70C of FIGS. 4A-4C. As quantization typically involves multiplication, incorporating these factors into quantization unit 40 may not increase the implementation complexity of quantization unit 40. In this respect, removing the factors from scaled 4×4 DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding to generate a coded bitstream (102). Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. Entropy coding unit 46 outputs the entropy coded coefficients as a coded bitstream which is stored to a memory or storage device and/or sent to video decoder 26 (104).

Reconstruction unit 42 and inverse transform unit 44 reconstruct quantized coefficients and apply inverse transformation, respectively, to reconstruct the residual block. Summation unit 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 6:
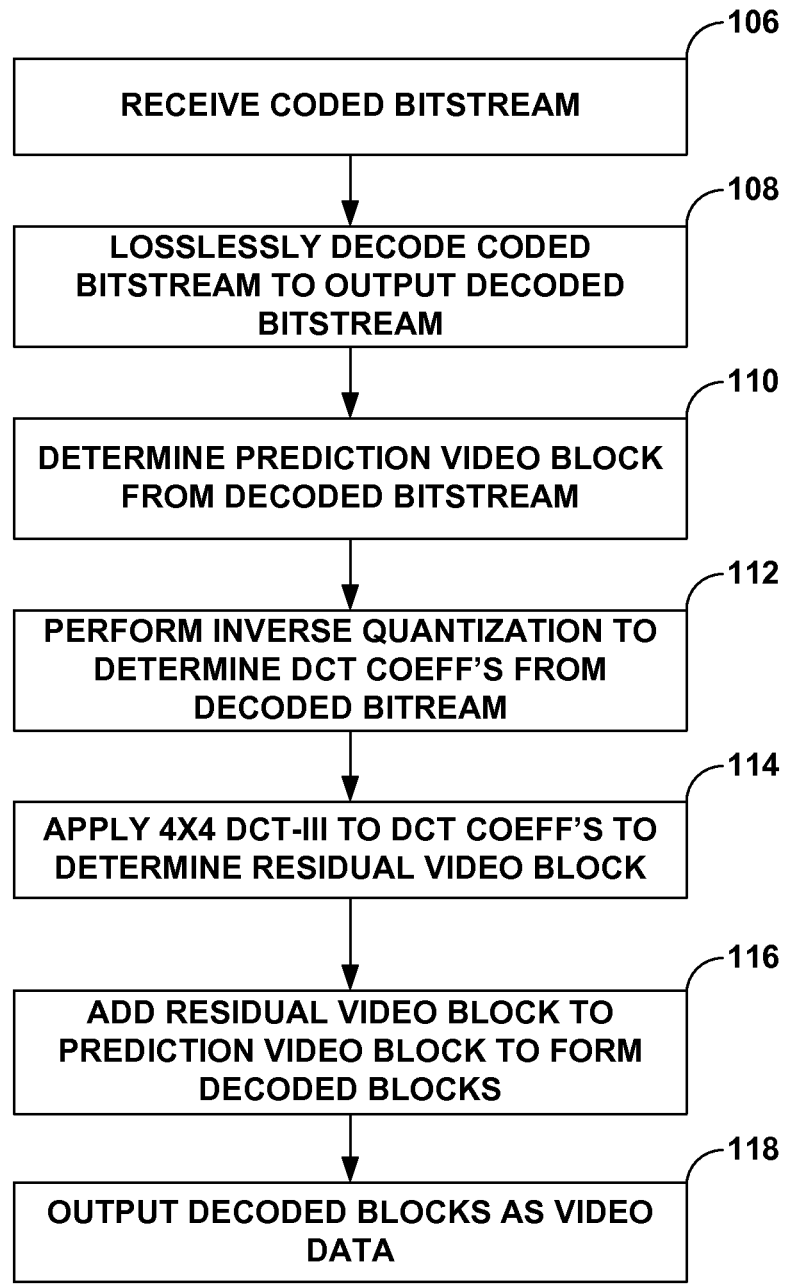
FIG. 6 is a flowchart illustrating example operation of a coding device in applying a 4×4 DCT-III implementation constructed in accordance with the techniques of this disclosure.

FIG. 6 is a flowchart illustrating example operation of a coding device, such as video decoder 26 of FIG. 3, in applying a 4×4 DCT-III implementation constructed in accordance with the techniques of this disclosure. Video decoder 26 receives an encoded video bitstream that has been encoded by video encoder 20. In particular, entropy decoding unit 54 receives the encoded video bitstream and decodes from the bitstream quantized residual coefficients and quantized parameters, as well as other information, such as macroblock coding mode and motion information, which may include motion vectors and block partitions (106, 108). Motion compensation unit 56 receives the motion vectors and block partitions and one or more reconstructed reference frames from reference frame store 62 to produce a prediction video block (110).

Reconstruction unit 58 inverse quantizes, i.e., de-quantizes, the quantized block coefficients (112). Inverse transform unit 60 applies an inverse transform, e.g., an inverse DCT, to the coefficients to produce residual blocks. More specifically, inverse transform unit 60 includes a scaled 4×4 DCT-III unit 68, which inverse transform unit 60 applies to the coefficients to produce residual blocks (114). Scaled 4×4 DCT-III unit 68, which is the inverse of scaled 4×4 DCT-II unit 52 shown in FIG. 2, may transform the coefficients from the frequency domain to the spatial domain to produce the residual blocks. Similar to quantization unit 40 above, reconstruction unit 58 accounts for the scaled nature of 4×4 DCT-III unit 68 by incorporating the external factors removed during factorization into the reconstruction process with little if any increase in implementation complexity. Removing factors from scaled 4×4 DCT-III unit 68 may reduce implementation complexity, thereby resulting in a net decrease of complexity for video decoder 26.

The prediction video blocks are then summed by summer 66 with the residual blocks to form decoded blocks (116). A deblocking filter (not shown) may be applied to filter the decoded blocks to remove blocking artifacts. The filtered blocks are then placed in reference frame store 62, which provides reference frame for decoding of subsequent video frames and also produces decoded video to drive a display device, such as display device 28 of FIG. 1 (118).

Figure 7A:
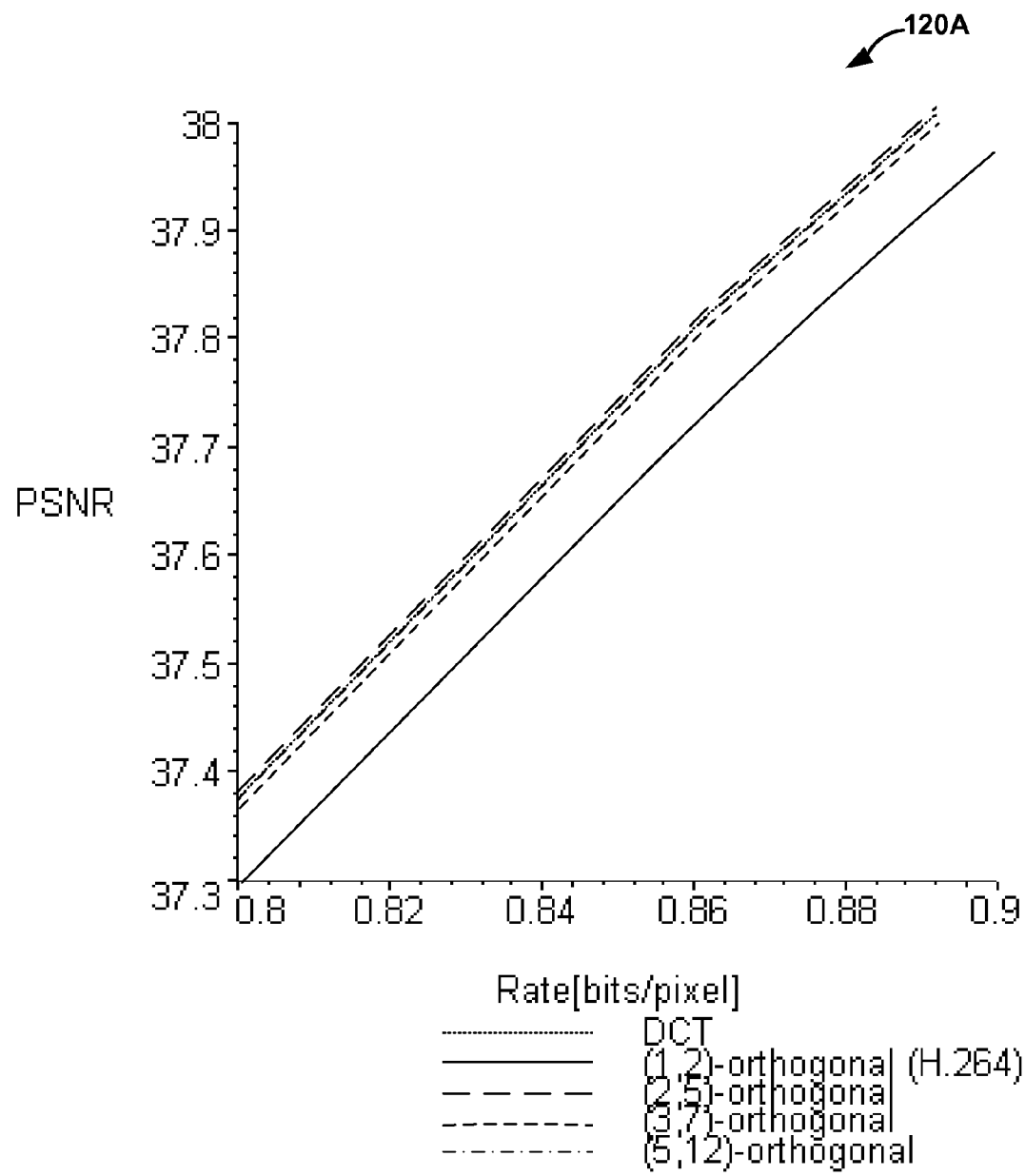
FIGS. 7A-7C are diagrams illustrating graphs of peak signal-to-noise ratios with respect to bitrates for each of three different 4×4 DCT-II implementations constructed in accordance with the techniques of this disclosure.
Figure 7B:
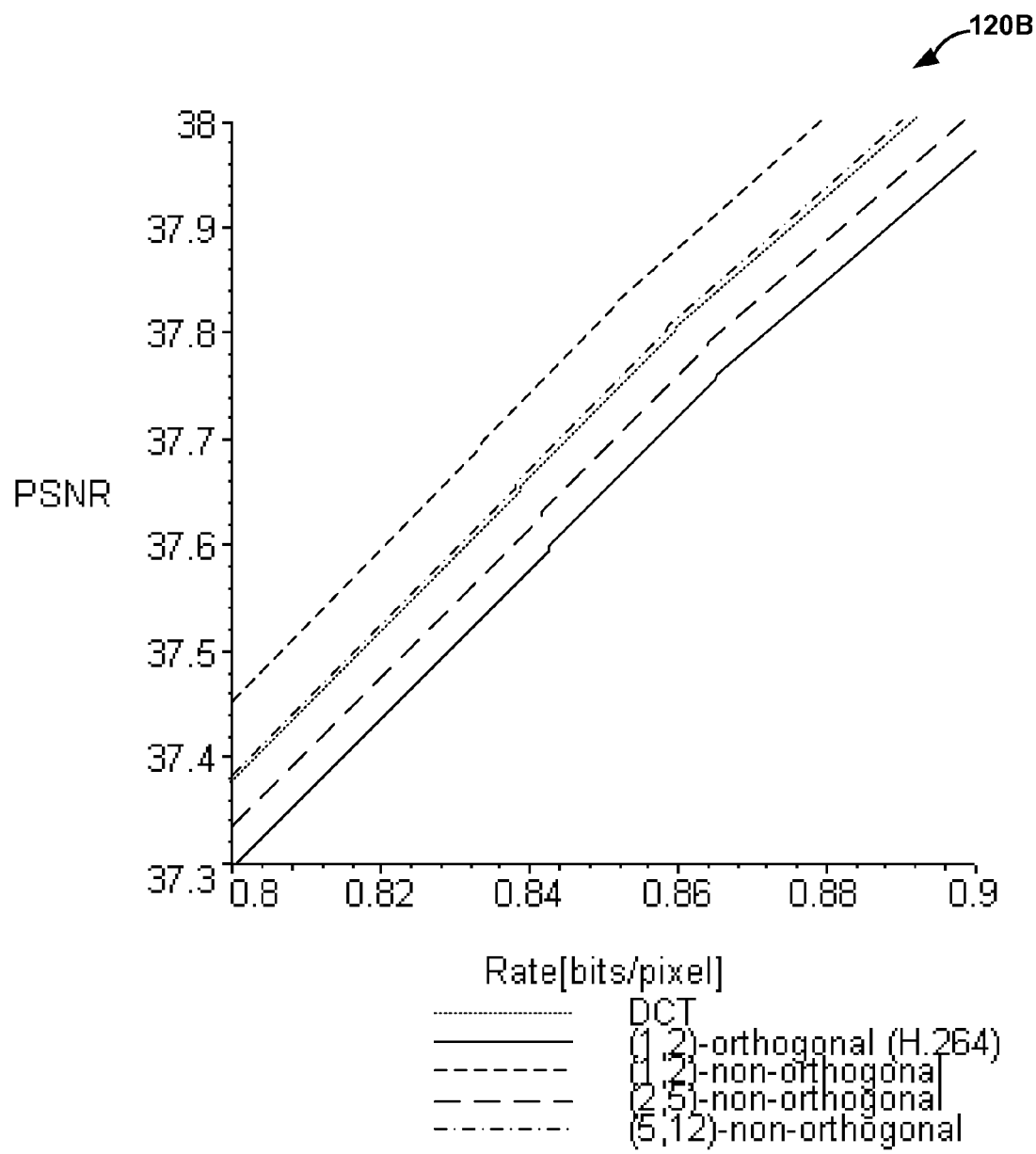
Figure 7C:
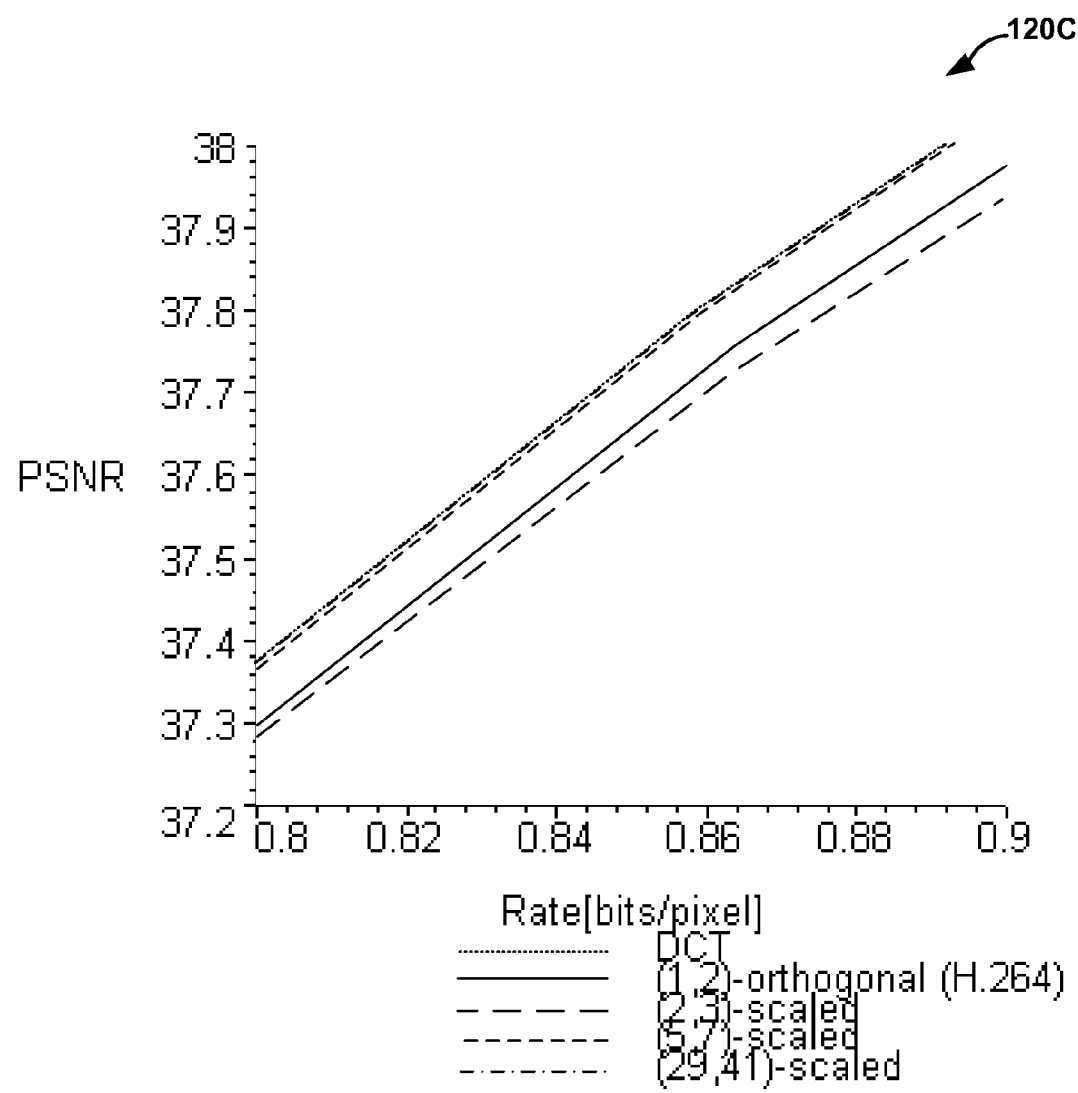

FIGS. 7A-7C are diagrams illustrating graphs 120A-120C of peak signal-to-noise ratios with respect to bitrates for each of three different 4×4 DCT-II implementations, such as implementations 70A-70C of FIGS. 4A-4C, constructed in accordance with the techniques of this disclosure. FIG. 7A is a diagram illustrating graph 120A of peak signal-to-noise ratios (PSNR) with respect to bitrates for an orthogonal scaled 4×4 DCT-II implementation, such as implementations 70A of FIG. 4A, constructed in accordance with the techniques of this disclosure. According to the key of graph 120A, the solid line represents the standard 4×4 DCT-II implementation incorporated by the H.264 video coding standard. The dotted line represents a theoretical best DCT implementation capable of performing irrational multiplication and additions. The long dashed line represents orthogonal 4×4 DCT-II implementation 70A with internal factors C and S set to 2 and 5 respectively. The short dashed line represents orthogonal 4×4 DCT-II implementation 70A with internal factors C and S set to 3 and 7 respectfully. The dashed-dotted line represents orthogonal 4×4 DCT-II implementation 70A with internal factors C and S set to 5 and 12 respectfully. Notably, orthogonal 4×4 DCT-II implementation 70A with internal factors C and S set to 2 and 5 more accurately approximates the theoretical best DCT-II implementation than the H.264 implementation. Moreover, orthogonal 4×4 DCT-II implementation 70A with internal factors C and S set to 3 and 7 or 5 and 12 do not provide much gain in terms of PSNR over orthogonal 4×4 DCT-II implementation 70A with internal factors C and S set to 2 and 5, despite these implementations involving a more complex implementation.

FIG. 7B is a diagram illustrating graph 120B of peak signal-to-noise ratios (PSNR) with respect to bitrates for an orthogonal scaled 4×4 DCT-II implementation, such as implementations 70B of FIG. 4B, constructed in accordance with the techniques of this disclosure. According to the key of graph 120B, the solid line represents the standard orthogonal 4×4 DCT-II implementation incorporated by the H.264 video coding standard. The dotted line represents a theoretical best DCT implementation capable of performing irrational multiplication and additions. The short dashed line represents near-orthogonal 4×4 DCT-II implementation 70B with internal factors C and S set to 1 and 2 respectfully. The long dashed line represents near-orthogonal 4×4 DCT-II implementation 70B with internal factors C and S set to 2 and 5 respectively. The dashed-dotted line represents near-orthogonal 4×4 DCT-II implementation 70B with internal factors C and S set to 5 and 12 respectfully. Notably, near-orthogonal 4×4 DCT-II implementation 70B with internal factors C and S set to 2 and 5 is not much better in terms of PSNR in comparison to the H.264 implementation. However, near-orthogonal 4×4 DCT-II implementation 70B with internal factors C and S set to 1 and 2 provides a better PSNR than even the theoretical DCT implementation, while near-orthogonal 4×4 DCT-II implementation 70B with internal factors C and S set to 5 and 12 most accurately represents the theoretical DCT implementation.

FIG. 7C is a diagram illustrating graph 120C of peak signal-to-noise ratios (PSNR) with respect to bitrates for a near-orthogonal scaled 4×4 DCT-II implementation derived from an alternative factorization, such as implementations 70C of FIG. 4C, and constructed in accordance with the techniques of this disclosure. According to the key of graph 120C, the solid line represents the standard orthogonal 4×4 DCT-II implementation incorporated by the H.264 video coding standard. The dotted line represents a theoretical best DCT implementation capable of performing irrational multiplication and additions. The long dashed line represents near-orthogonal 4×4 DCT-II implementation 70C with internal factors B and A set to 2 and 3 respectively. The short dashed line represents near-orthogonal 4×4 DCT-II implementation 70C with internal factors B and A set to 5 and 7 respectfully. The dashed-dotted line represents near-orthogonal 4×4 DCT-II implementation 70C with internal factors B and A set to 29 and 41 respectfully. Notably, near-orthogonal 4×4 DCT-II implementation 70C with internal factors B and A set to 2 and 3 is worse in terms of PSNR than the H.264 implementation. However, near-orthogonal 4×4 DCT-II implementation 70C with internal factors B and A set to 5 and 7 provides a better PSNR than the H.264 implementation and accurately represents the theoretical DCT implementation without requiring the complexity of near-orthogonal 4×4 DCT-II implementation 70C with internal factors C and S set to 29 and 41.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical structure, and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. In this sense, the computer-readable storage medium may, in some respects, be considered a non-transitory computer-readable storage medium.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

The invention claimed is:

1. An apparatus for encoding media data comprising:
   a 4×4 discrete cosine transform (DCT) hardware unit that implements an orthogonal 4×4 DCT having an odd portion that applies first and second internal factors (C, S) that are related to a scaled factor ($\xi$) such that the scaled factor equals a square root of a sum of a square of the first internal factor (C) plus a square of the second internal factor (S), the first and second internal factors (C, S) are co-prime and greater than or equal to two, wherein the 4×4 DCT hardware unit applies the 4×4 DCT implementation to media data to transform the media data from a spatial domain to a frequency domain and to determine one or more DCT coefficients, and wherein the 4×4 DCT hardware unit includes a quantization unit that multiplies the scaled factor (ξ) with one or more DCT coefficients to determine quantized DCT coefficients.

2. The apparatus of claim 1,
wherein the internal factor C equals two, and
wherein the internal factor S equals five.

3. The apparatus of claim 1,
wherein the internal factor C equals three, and
wherein the internal factor S equals seven.

4. The apparatus of claim 1,
wherein the internal factor C equals five, and
wherein the internal factor S equals twelve.

5. The apparatus of claim 1,
wherein the internal factor C equals seventeen, and
wherein the internal factor S equals forty one.

6. The apparatus of claim 1, wherein the 4×4 DCT hardware unit comprises a processor that executes software to implement the orthogonal 4×4 DCT.

7. A method for encoding media data comprising:
applying an orthogonal 4×4 discrete cosine transform (DCT) implementation with a 4×4 DCT hardware unit to media data to transform the media data from a spatial domain to a frequency domain and to determine one or more DCT coefficients, wherein the orthogonal 4×4 DCT implementation includes an odd portion that applies first and second internal factors (C, S) that are related to a scaled factor (ξ) such that the scaled factor equals a square root of a sum of a square of the first internal factor (C) plus a square of the second internal factor (S), the first and second internal factors (C, S) are co-prime and greater than or equal to two, and wherein the 4×4 DCT hardware unit includes a quantization unit that multiplies the scaled factor (ξ) with one or more DCT coefficients to determine quantized DCT coefficients.

8. The method of claim 7,
wherein the internal factor C equals two, and
wherein the internal factor S equals five.

9. The method of claim 7,
wherein the internal factor C equals three, and
wherein the internal factor S equals seven.

10. The method of claim 7,
wherein the internal factor C equals five, and
wherein the internal factor S equals twelve.

11. The method of claim 7,
wherein the internal factor C equals seventeen, and
wherein the internal factor S equals forty one.

12. An apparatus for encoding media data comprising:
means for applying an orthogonal 4×4 discrete cosine transform (DCT) implementation to media data to transform the media data from a spatial domain to a frequency domain and to determine one or more DCT coefficients, wherein the orthogonal 4×4 DCT implementation includes an odd portion that applies first and second internal factors (C, S) that are related to a scaled factor (ξ) such that the scaled factor equals a square root of a sum of a square of the first internal factor (C) plus a square of the second internal factor (S), the first and second internal factors (C, S) are co-prime and greater than or equal to two, and wherein the means for applying an orthogonal 4×4 DCT includes a means for quantization that multiplies the scaled factor (ξ) with one or more DCT coefficients to determine quantized DCT coefficients.

13. The apparatus of claim 12,
wherein the internal factor C equals two, and
wherein the internal factor S equals five.

14. The apparatus of claim 12,
wherein the internal factor C equals three, and
wherein the internal factor S equals seven.

15. The apparatus of claim 12,
wherein the internal factor C equals five, and
wherein the internal factor S equals twelve.

16. The apparatus of claim 12,
wherein the internal factor C equals seventeen, and
wherein the internal factor S equals forty one.

17. A non-transitory computer-readable storage medium that stores instructions for encoding media data that, when executed by a processor, cause the processor to:
apply an orthogonal 4×4 discrete cosine transform (DCT) implementation with a 4×4 DCT hardware unit to media data to transform the media data from a spatial domain to a frequency domain and to determine one or more DCT coefficients, wherein the orthogonal 4×4 DCT implementation includes an odd portion that applies first and second internal factors (C, S) that are related to a scaled factor (ξ) such that the scaled factor equals a square root of a sum of a square of the first internal factor (C) plus a square of the second internal factor (S), the first and second internal factors (C, S) are co-prime and greater than or equal to two, and wherein the 4×4 DCT hardware unit includes a quantization unit that multiplies the scaled factor (ξ) with one or more DCT coefficients to determine quantized DCT coefficients.

18. An apparatus for encoding media data comprising:
a 4×4 discrete cosine transform (DCT) hardware unit, wherein the DCT hardware unit implements a non-orthogonal 4×4 DCT having an odd portion that applies first and second internal factors (C, S) that are related to a scaled factor (ξ) by the following equation:

$$\xi = \frac{C+S}{\omega+\psi},$$

wherein variables ω and ψ denote irrational internal transform factors and variables C and S denote dyadic rational internal transform factors used in place of variables ω and ψ in integer implementations of the non-orthogonal 4×4 DCT, the first and second internal factors (C, S) are co-prime and greater than or equal to two, wherein the 4×4 DCT hardware unit applies the 4×4 DCT implementation to media data to transform the media data from a spatial domain to a frequency domain and to determine one or more DCT coefficients, and wherein the 4×4 DCT hardware unit includes a quantization unit that multiplies the scaled factor (ξ) with one or more DCT coefficients to determine quantized DCT coefficients.

19. The apparatus of claim 18,
wherein the internal factor C equals two, and
wherein the internal factor S equals five.

20. The apparatus of claim 18,
wherein the internal factor C equals five, and
wherein the internal factor S equals twelve.

21. The apparatus of claim 18, wherein the 4×4 DCT hardware unit comprises a processor that executes software to implement the non-orthogonal 4×4 DCT.

22. A method for encoding media data comprising:
applying an orthogonal 4×4 discrete cosine transform (DCT) with a 4×4 DCT hardware unit to DCT coefficients representative of media data to transform the media data from a spatial domain to a frequency domain and to determine one or more DCT coefficients,
wherein the 4×4 DCT comprises an DCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT, the first and second internal factors (C, S) are co-prime and greater than or equal to two, and
wherein the 4×4 DCT hardware unit includes a quantization unit that multiplies the scaled factor (ξ) with one or more DCT coefficients to determine quantized DCT coefficients.

23. The method of claim 22,
wherein the internal factor C equals two, and
wherein the internal factor S equals five.

24. The method of claim 22,
wherein the internal factor C equals five, and
wherein the internal factor S equals twelve.

25. An apparatus for encoding media data comprising:
means for applying an orthogonal 4×4 discrete cosine transform (DCT) with a 4×4 DCT hardware unit to DCT coefficients representative of media data to transform the media data from a spatial domain to a frequency domain and to determine one or more DCT coefficients,
wherein the 4×4 DCT comprises a DCT of a non-orthogonal 4×4 DCT having an odd portion that applies first and second internal factors (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT, the first and second internal factors (C, S) are co-prime and greater than or equal to two, and
wherein the means for applying a 4×4 DCT includes a means for quantization that multiplies of the scaled factor (ξ) with one or more DCT coefficients to determine quantized DCT coefficients.

26. The apparatus of claim 25,
wherein the internal factor C equals two, and
wherein the internal factor S equals five.

27. The apparatus of claim 25,
wherein the internal factor C equals five, and
wherein the internal factor S equals twelve.

28. A non-transitory computer-readable storage medium that stores instructions for encoding media data that, when executed by a processor, cause the processor to:
apply a non-orthogonal 4×4 discrete cosine transform (DCT) with a 4×4 DCT hardware unit to media data to transform the media data from a spatial domain to a frequency domain and to determine one or more DCT coefficients,
wherein the non-orthogonal 4×4 DCT includes an odd portion that applies first and second variables (C, S) that are related to a scaled factor (ξ) by the following equation:

$$\xi = \frac{C+S}{\omega + \psi},$$

wherein variables ω and ψ denote irrational internal transform factors and variables C and S denote dyadic rational internal transform factors used in place of variables ω and ψ in integer implementations of the non-orthogonal 4×4 DCT, the first and second internal factors (C, S) are co-prime and greater than or equal to two, and
wherein the 4×4 DCT hardware unit includes a quantization unit that multiplies the scaled factor (ξ) with one or more DCT coefficients to determine quantized DCT coefficients.

29. An apparatus for encoding media data comprising,
a 4×4 discrete cosine transform (DCT) hardware unit that implements a non-orthogonal 4×4 DCT having an odd portion that applies first and second internal factors (A, B) as a part of the 4×4 inverse DCT that are related to a scaled factor (ξ) by the following equation:

$$\xi = \frac{A+B}{1 + 1/\sqrt{2}},$$

wherein the scaled factor (ξ) equals a sum of the first internal factor (A) plus the second internal factor (B) divided by one plus one divided by the square root of two, the first and second internal factors (A, B) are co-prime and greater than or equal to two,
wherein the 4×4 DCT hardware unit applies the 4×4 DCT implementation to media data to transform the media data from a spatial domain to a frequency domain and to determine one or more DCT coefficients, and
wherein the 4×4 DCT hardware unit includes a quantization unit that multiplies the scaled factor (ξ) with one or more DCT coefficients to determine quantized DCT coefficients.

30. The apparatus of claim 29,
wherein the internal factor A equals three, and
wherein the internal factor B equals two.

31. The apparatus of claim 29,
wherein the internal factor A equals seven, and
wherein the internal factor B equals five.

32. The apparatus of claim 29,
wherein the internal factor A equals twenty nine, and
wherein the internal factor B equals forty one.

33. The apparatus of claim 29, wherein the 4×4 DCT hardware unit comprises a processor that executes software to implement the non-orthogonal 4×4 DCT.

34. A method for encoding media data comprising:
applying a non-orthogonal 4×4 discrete cosine transform (DCT) with a 4×4 DCT hardware unit to media data to transform the media data from a spatial domain to a frequency domain and to determine one or more DCT coefficients,
wherein the non-orthogonal 4×4 DCT includes an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two, the first and second internal factors (A, B) are co-prime and greater than or equal to two, and
wherein the 4×4 DCT hardware unit includes a quantization unit that multiplies the scaled factor (ξ) with one or more DCT coefficients to determine quantized DCT coefficients.

35. The method of claim 34,
wherein the internal factor A equals three, and
wherein the internal factor B equals two.

36. The method of claim 34,
wherein the internal factor A equals seven, and
wherein the internal factor B equals five.

37. The method of claim 34,
wherein the internal factor A equals twenty nine, and
wherein the internal factor B equals forty one.

38. An apparatus for encoding media data comprising:
means for applying a non-orthogonal 4×4 discrete cosine transform (DCT) with a 4×4 DCT hardware unit to media data to transform the media data from a spatial domain to a frequency domain and to determine one or more DCT coefficients,
wherein the non-orthogonal 4×4 DCT includes an odd portion that applies first and second internal factors (A, B) that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two, the first and second internal factors (A, B) are co-prime and greater than or equal to two, and
wherein the means for applying a non-orthogonal 4×4 DCT includes a means for quantization that multiplies the scaled factor (ξ) with one or more DCT coefficients to determine quantized DCT coefficients.

39. The apparatus of claim 38,
wherein the internal factor A equals three, and
wherein the internal factor B equals two.

40. The apparatus of claim 38,
wherein the internal factor A equals seven, and
wherein the internal factor B equals five.

41. The apparatus of claim 38,
wherein the internal factor A equals twenty nine, and
wherein the internal factor B equals forty one.

42. A non-transitory computer-readable storage medium that stores instructions for encoding media data that, when executed by a processor, cause the processor to:
apply a non-orthogonal 4×4 discrete cosine transform (DCT) with a 4×4 DCT hardware unit to media data to transform the media data from a spatial domain to a frequency domain and to determine one or more DCT coefficients,
wherein the non-orthogonal 4×4 DCT includes an odd portion that applies first and second internal factors (A, B) as a part of the non-orthogonal 4×4 DCT that are related to a scaled factor (ξ) by the following equation:

$$\xi = \frac{A+B}{1+1/\sqrt{2}},$$

wherein the scaled factor (ξ) equals a sum of the first internal factor (A) plus the second internal factor (B) divided by one plus one divided by the square root of two, the first and second internal factors (A, B) are co-prime and greater than or equal to two, and
wherein the 4×4 DCT hardware unit includes a quantization unit that multiplies the scaled factor (ξ) with one or more DCT coefficients to determine quantized DCT coefficients.

* * * * *